(12) United States Patent
Gulati et al.

(10) Patent No.: US 11,733,346 B2
(45) Date of Patent: Aug. 22, 2023

(54) ASSISTANCE INFORMATION TO AID WITH COOPERATIVE RADAR SENSING WITH IMPERFECT SYNCHRONIZATION

(71) Applicant: QUALCOMM Incorporated, San Diego, CA (US)

(72) Inventors: Kapil Gulati, Belle Mead, NJ (US); Junyi Li, Franklin Park, NJ (US)

(73) Assignee: QUALCOMM INCORPORATED, San Diego, CA (US)

( * ) Notice: Subject to any disclaimer, the term of this patent is extended or adjusted under 35 U.S.C. 154(b) by 254 days.

(21) Appl. No.: 17/184,294

(22) Filed: Feb. 24, 2021

(65) Prior Publication Data

US 2022/0268878 A1    Aug. 25, 2022

(51) Int. Cl.
*G01S 7/00* (2006.01)
*G01S 13/931* (2020.01)

(52) U.S. Cl.
CPC ............ *G01S 7/006* (2013.01); *G01S 13/931* (2013.01); *G01S 2013/9316* (2020.01)

(58) Field of Classification Search
CPC .......... G01S 7/003; G01S 7/006; G01S 7/023; G01S 13/87; G01S 13/878; G01S 13/931; G01S 2013/9316
See application file for complete search history.

(56) References Cited

U.S. PATENT DOCUMENTS

| 9,086,481 B1 * | 7/2015 | Dowdall | G01S 13/58 |
| 10,082,562 B1 * | 9/2018 | Abari | G01S 13/343 |
| 10,620,297 B2 * | 4/2020 | Cohen | G01S 13/42 |
| 11,422,227 B2 * | 8/2022 | Degani | G01S 7/0235 |
| 2005/0156780 A1 * | 7/2005 | Bonthron | G01S 3/48 342/134 |
| 2014/0195138 A1 * | 7/2014 | Stelzig | G08G 1/0116 701/119 |
| 2016/0124075 A1 * | 5/2016 | Vogt | G01S 13/536 342/13 |
| 2017/0293027 A1 * | 10/2017 | Stark | G01S 13/87 |
| 2017/0310758 A1 * | 10/2017 | Davis | G01S 13/931 |
| 2018/0367871 A1 * | 12/2018 | Zeng | G01S 17/931 |
| 2019/0369233 A1 * | 12/2019 | Niesen | H04W 4/46 |
| 2019/0383925 A1 * | 12/2019 | Gulati | G01S 13/345 |

(Continued)

OTHER PUBLICATIONS

International Search Report and Written Opinion—PCT/US2022/015131—ISA/EPO—dated May 13, 2022.

*Primary Examiner* — Peter M Bythrow
(74) *Attorney, Agent, or Firm* — Procopio, Cory, Hargreaves & Savitch LLP

(57) ABSTRACT

The apparatus (e.g., a first radar device) may be configured to receive a second radar waveform from a second radar device; determine a transmission timing difference between a transmission time of a first radar waveform and a transmission time of the second radar waveform, where the first radar waveform may be transmitted by the first radar device; and generate a radar point cloud associated with one or more targets based on the received second radar waveform and the determined transmission timing difference. A second radar device may be configured to transmit a second radar waveform; receive, from one or more targets, one or more reflections of the second radar waveform; and transmit, to a first radar device, cooperative radar sensing information regarding the received one or more reflections.

30 Claims, 13 Drawing Sheets

(56) References Cited

U.S. PATENT DOCUMENTS

| | | | |
|---|---|---|---|
| 2019/0391250 A1* | 12/2019 | Cohen | G01S 13/87 |
| 2020/0256948 A1* | 8/2020 | Jansen | G01S 13/34 |
| 2020/0309897 A1* | 10/2020 | Ray | G01S 13/876 |
| 2021/0072390 A1* | 3/2021 | Baek | G01S 17/931 |
| 2021/0279640 A1* | 9/2021 | Tu | G06V 10/764 |
| 2021/0286068 A1* | 9/2021 | Kumar | G01S 13/931 |
| 2022/0107414 A1* | 4/2022 | Maheshwari | G01S 17/89 |
| 2022/0178718 A1* | 6/2022 | Xia | G06K 9/6288 |

* cited by examiner

ASSISTANCE INFORMATION TO AID WITH COOPERATIVE RADAR SENSING WITH IMPERFECT SYNCHRONIZATION

BACKGROUND

Technical Field

The present disclosure relates generally to communication systems, and more particularly, to cooperative radar sensing.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

For millimeter wave (mmW) radars, vehicles may present "smooth" surfaces (e.g., surfaces with irregularities that are smaller than the wavelength of the radar waves). Incident mmW radar waves may experience specular reflections from such "smooth" surfaces and may not be reflected back to a mmW radar source (e.g., may not generate points in a radar point cloud). A failure to receive the reflected radar waves due to specular reflection may lead to a sparse point cloud. Accordingly, for mmW radars there may be a benefit to using cooperative (e.g., bi-static or multi-static) radar sensing to provide additional points in a radar point cloud based on mmW radar transmissions from another radar source(s).

Cooperative radar sensing with multiple radar devices may provide additional data. However, in order to achieve a desired radar resolution (e.g., 15 centimeters (cm)) based on cooperative radar sensing, timing synchronization should be better than a timing synchronization used for communication. For example, for a 15 cm radar resolution, a timing synchronization should be within approximately 0.5 nanoseconds (ns) compared to a timing synchronization of within approximately 3 microseconds (µm) used for communication. Such timing accuracy is difficult to achieve. Thus, it may be beneficial to achieve similar radar resolution without relying on achieving a timing accuracy of approximately 0.5 ns.

In an aspect of the disclosure, a method, a computer-readable medium, and an apparatus are provided. The apparatus may be a first radar device at a first user equipment (UE) (e.g., a vehicle) or the first UE itself. The first radar device may include a processor and/or modem at a first UE or the first UE itself. The first radar device may be configured to receive a second radar waveform from a second radar device; determine a transmission timing difference between a transmission time of a first radar waveform and a transmission time of the second radar waveform, where the first radar waveform may be transmitted by the first radar device; and generate a radar point cloud associated with one or more targets based on the received second radar waveform and the determined transmission timing difference. The first radar device may further be configured to transmit the first radar waveform and receive one or more reflections of the first radar waveform from one or more targets, where generating the radar point cloud is further based on the received one or more reflections of the first radar waveform. The first radar device may further be configured to receive additional information regarding at least one target of the one or more targets, where at least one of determining the transmission timing difference or generating the radar point cloud is based on the received additional information.

In an aspect of the disclosure, a method, a computer-readable medium, and an apparatus are provided. The apparatus may be a second radar device at a second UE (e.g., a vehicle) or the second UE itself. The second radar device may include a processor and/or modem at a second UE or the second UE itself. The second radar device may be configured to transmit a second radar waveform; receive, from one or more targets, one or more reflections of the second radar waveform; and transmit, to a first radar device, cooperative radar sensing information regarding the received one or more reflections. The second radar device may further be configured to receive a first radar waveform from the first radar device, where the cooperative radar sensing information further includes information regarding the received first radar waveform. The second radar device may further be configured to determine a transmission timing difference between a transmission time of a first radar waveform from the first radar device and a transmission time of the second radar waveform, where the cooperative radar sensing information includes the determined transmission timing difference. The second radar device may further be configured to generate one or more candidate radar point clouds associated with the one or more targets based on the first radar waveform and the determined transmission timing difference, where the cooperative radar sensing information includes information regarding the generated one or more candidate radar point clouds.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
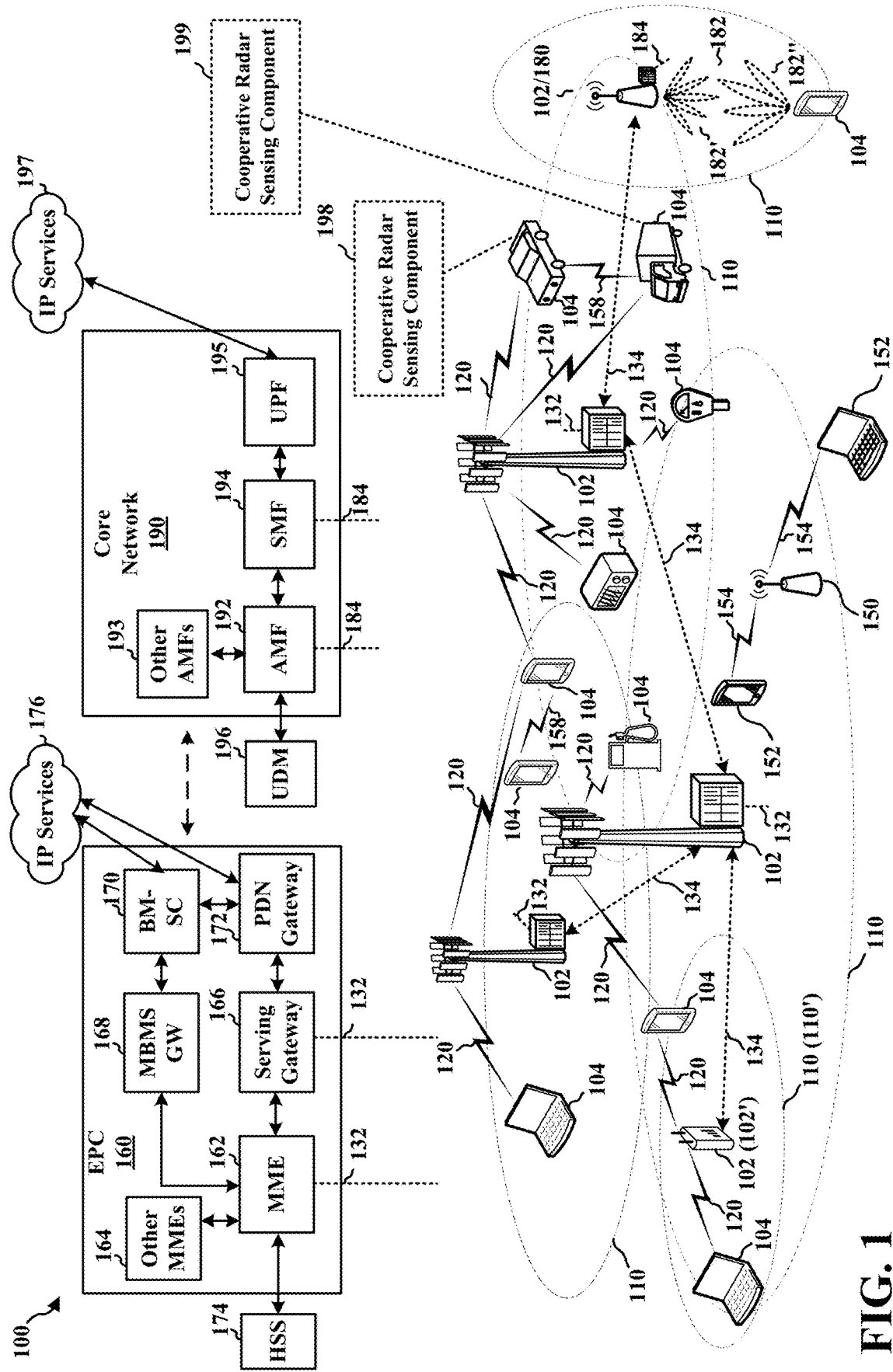
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may include a cooperative radar sensing component 198 that may be configured to receive a second radar waveform from a second radar device; determine a transmission timing difference between a transmission time of a first radar waveform and a transmission time of the second radar waveform, where the first radar waveform may be transmitted by the first radar device; and generate a radar point cloud associated with one or more targets based on the received second radar waveform and the determined transmission timing difference. In certain aspects, the UE 104 may include a cooperative radar sensing component 199 configured to transmit a second radar waveform; receive, from one or more targets, one or more reflections of the second radar waveform; and transmit, to a first radar device, cooperative radar sensing information regarding the received one or more reflections. Although the following description may be focused on bi-static cooperative radar sensing, the concepts described herein may be applicable to other similar areas, such as multi-static cooperative radar sensing, or monostatic radar sensing using additional information as described below.

Figure 2:
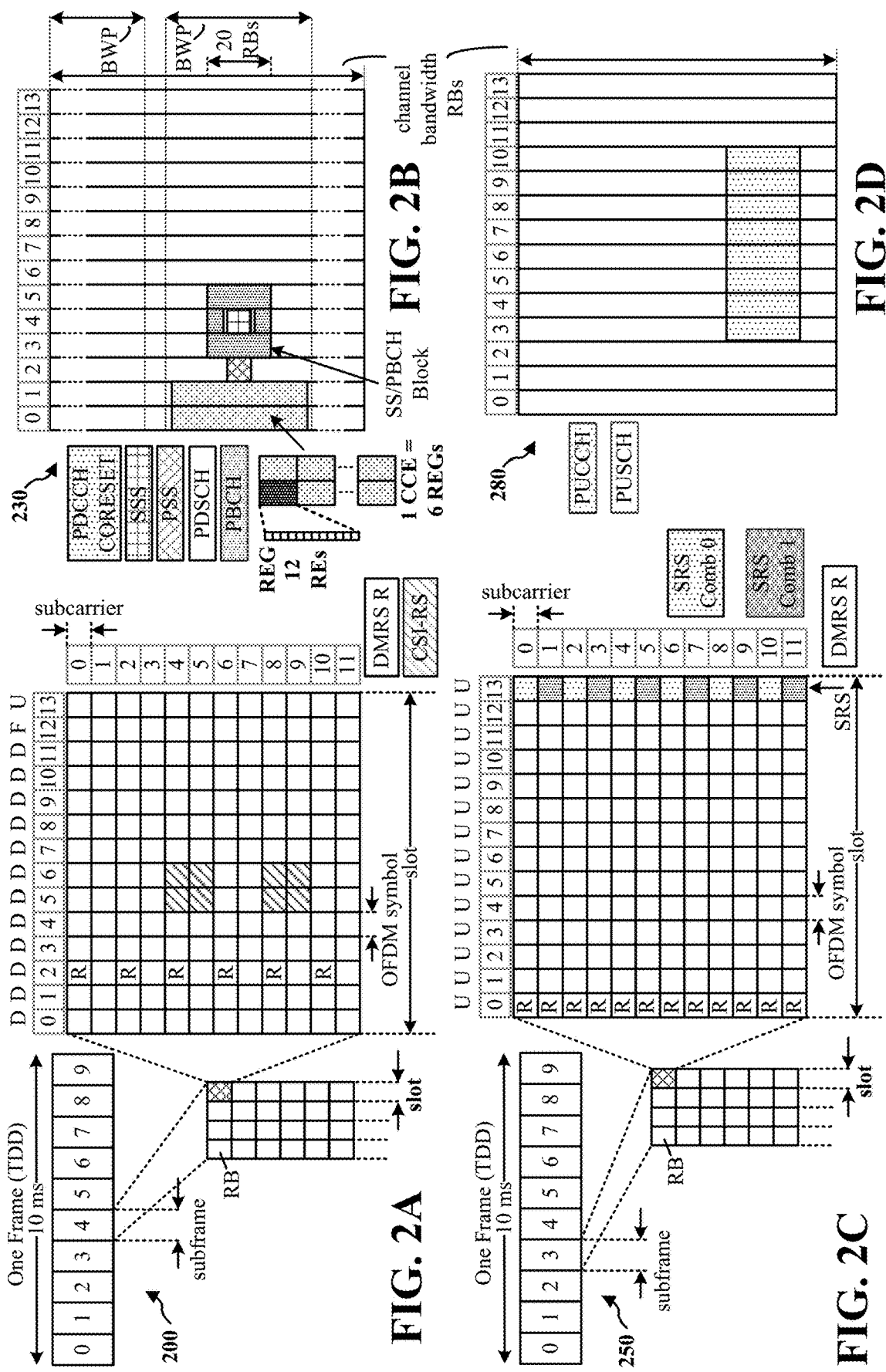
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies μ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and $2^\mu$ slots/subframe. The subcarrier spacing and symbol length/duration are a function of the numerology. The subcarrier spacing may be equal to $2^\mu*15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) information (ACK/negative ACK (NACK)) feedback. The PUSCH carries data, and may additionally be used to carry a buffer status report (BSR), a power headroom report (PHR), and/or UCI.

Figure 3:
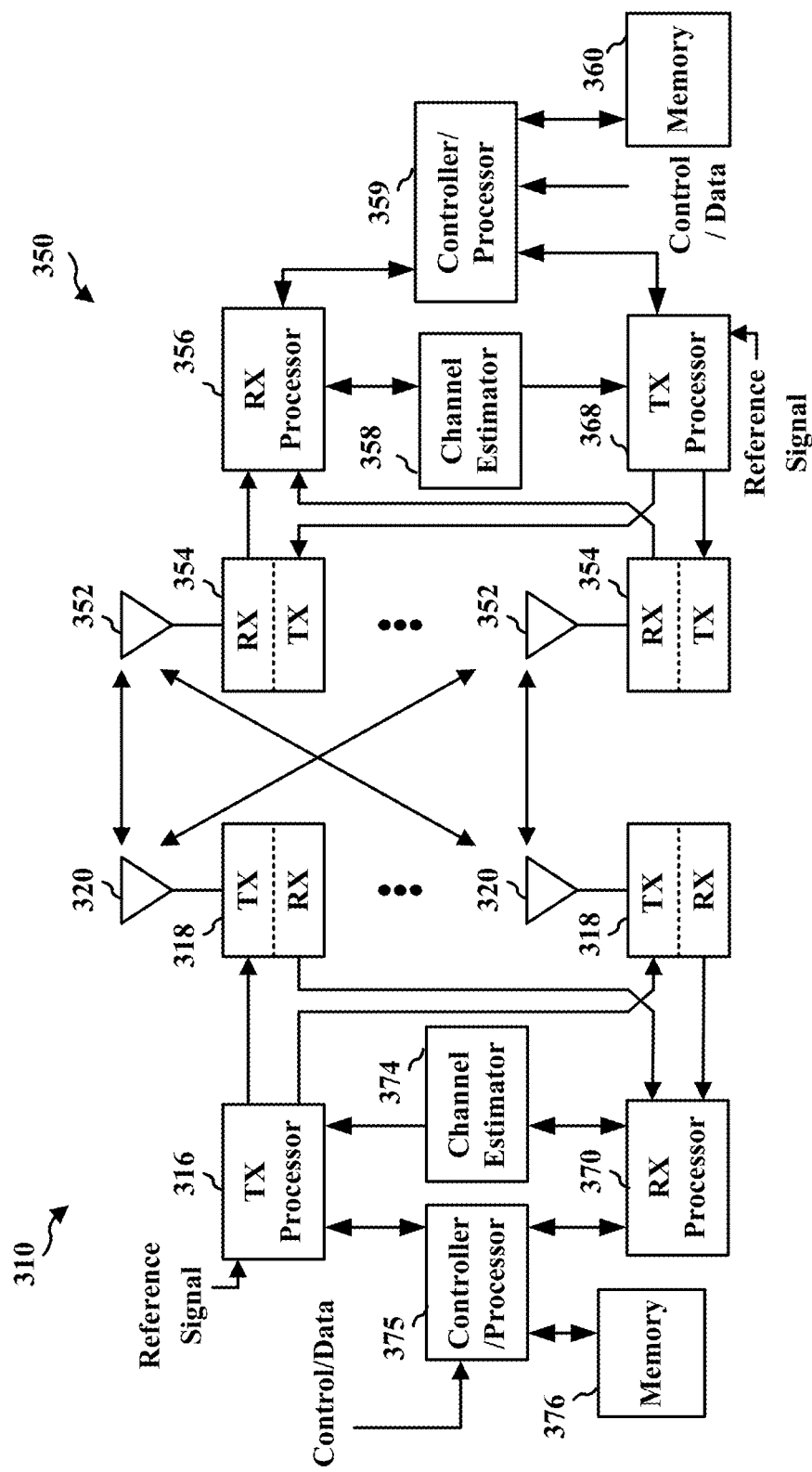
FIG. 3 is a diagram illustrating an example of a base station and UE in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BP SK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate an RF carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354 TX. Each transmitter 354 TX may modulate an RF carrier with a respective spatial stream for transmission.

The UL transmission is processed at the base station 310 in a manner similar to that described in connection with the receiver function at the UE 350. Each receiver 318 RX receives a signal through its respective antenna 320. Each receiver 318 RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1. At least one of the TX processor 368, the RX processor 356, and the controller/processor 359 may be configured to perform aspects in connection with 199 of FIG. 1.

For mmW radars, vehicles may present "smooth" surfaces (e.g., surfaces with irregularities that are smaller than the wavelength of the radar waves). Incident mmW radar waves may experience specular reflections from such "smooth" surfaces and may not be reflected back to a mmW radar source (e.g., may not generate points in a radar point cloud). A failure to receive the reflected radar waves due to specular reflection may lead to a sparse point cloud. Accordingly, for mmW radars there may be a benefit to using cooperative (e.g., bi-static or multi-static) radar sensing to provide additional points in a radar point cloud based on mmW radar transmissions from another radar source(s).

Cooperative radar sensing with multiple radar devices may provide additional data. However, in order to achieve a desired radar resolution (e.g., 15 cm) based on cooperative radar sensing, timing synchronization should be better than a timing synchronization used for communication. For example, for a 15 cm radar resolution, a timing synchronization should be within approximately 0.5 ns compared to a timing synchronization of within approximately 3 μm used for communication. Such timing accuracy may be difficult to achieve. Thus, it may be beneficial to achieve similar radar resolution without relying on achieving a timing accuracy of approximately 0.5 ns.

Figure 4:
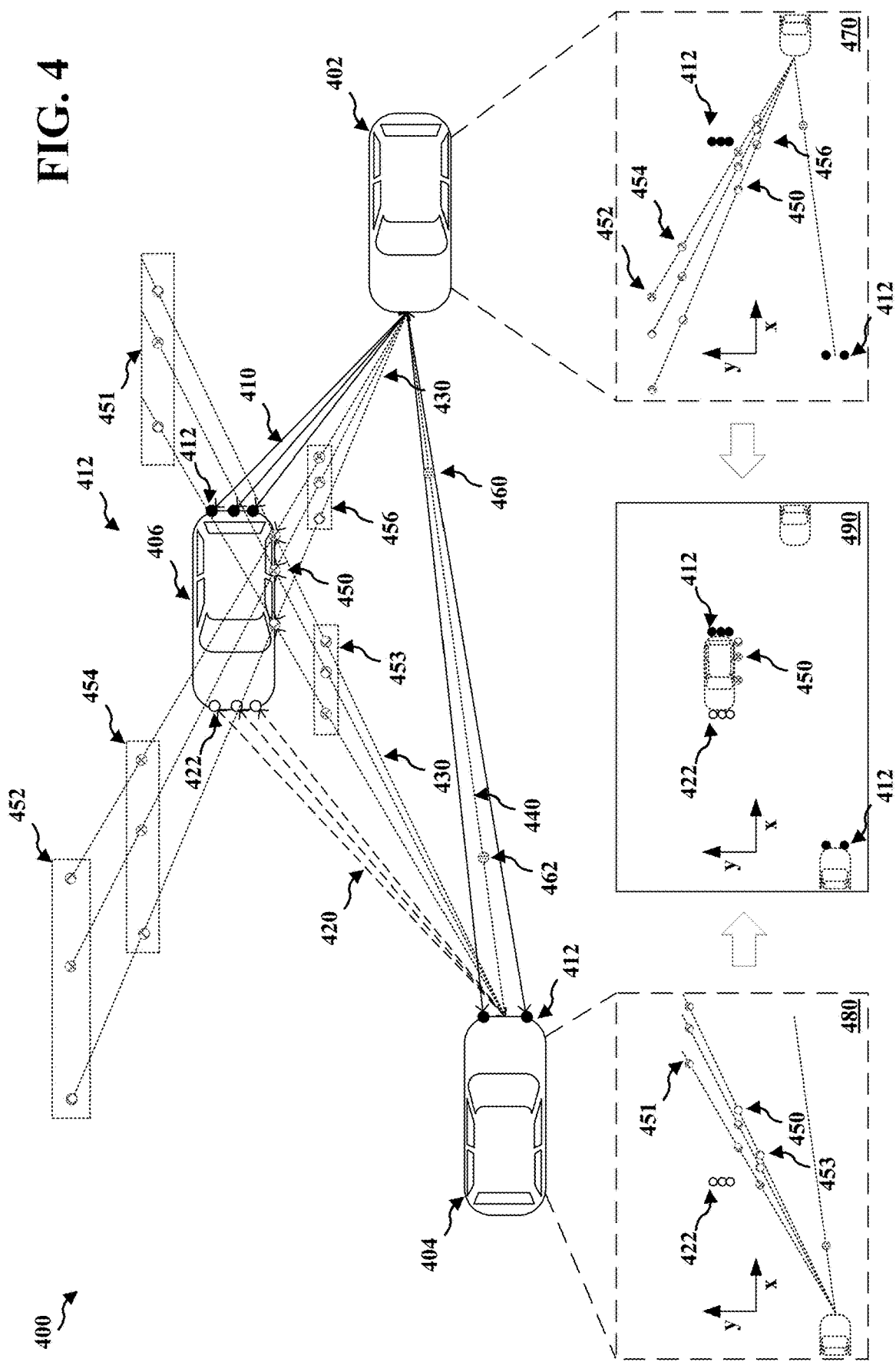
FIG. 4 includes a diagram illustrating cooperative radar sensing for a particular target.

FIG. 4 includes a diagram 400 illustrating cooperative radar sensing for a particular target 406. Diagram 400 includes vehicle (e.g., UE) 402 which may include a first radar device that performs radar sensing in cooperation with a second radar device of vehicle (e.g., UE) 404 (e.g., performs cooperative radar sensing). The following description will refer to operations performed by vehicles 402 and 404 with the understanding that the operations ascribed to the vehicles 402 and 404 may be performed by a first radar device of vehicle 402 or a second radar device of vehicle 404. As illustrated in FIG. 4, vehicles 402 and 404 may transmit radar waveforms 410 and 420 (e.g., mmW radar transmissions) during a same time period. Vehicles 402 and 404 may receive reflections of their own radar transmissions from a target. For example, vehicle 402 may receive reflections from points 412 on a target vehicle 406, while vehicle 404 may receive reflections from points 422 on the target vehicle 406. The target, in some aspects, may be one of many types of targets (e.g., a sedan, a truck, an 18-wheeler, an SUV, a pedestrian, etc.).

In addition to receiving reflections of its own radar transmissions, a vehicle 402 or 404 may receive (1) a direct radar waveform transmission 440 and/or (2) a reflected radar waveform transmission (e.g., specular reflections) 450 from radar transmissions 430 of the other vehicle 404 or 402. As illustrated, the vehicle 402 may receive direct radar waveform transmission 440 and, based on a timing difference between the radar waveform transmissions of vehicle 402 and 404, may be interpreted as a reflection from a transmission of vehicle 402 and result in identifying an erroneous point in a radar point cloud at 460. An erroneous point in a radar point cloud 462 may similarly be identified by vehicle 404 based on the same misinterpretation of a received radar waveform transmission for vehicle 402.

The vehicle 402 may receive the specular reflections from radar waveform transmissions 430 of vehicle 404, while vehicle 404 may receive similar specular reflections from radar waveform transmissions 430 of vehicle 402. The vehicles 402 and/or 404 may be able to identify that the radar waveform transmissions 430 that they may receive did not originate from a radar device associated with the vehicle 402 and/or 404. For example, different radar devices may have a different 'signature' (e.g., a feature of the radar waveform transmission that may be used to distinguish one radar waveform from another). If a transmission time of a radar waveform transmission received at a vehicle (e.g., vehicle 402) as a specular reflection is not known, the distance to the target may not be capable of being determined. For example, vehicle 402 may not be able to determine whether the specular reflections represent a target associated with points 450, 452, 454, or 456, while vehicle 404 may not be able to determine whether the specular reflections represent a target associated with points 450, 451, or 453. Points 450, 451, 452, 453, 454, and 456 are some examples of points associated with particular transmission timing differences (τ) along lines associated with a set of specular reflections received at vehicles 402 and 404.

In order to determine a radar point cloud, a vehicle 402 (or a radar device of the vehicle 402) may determine a transmit timing difference (τ) between a transmit timing of the first radar waveform transmission and a transmit timing of the second radar waveform transmission. The vehicle 402 may determine the transmit timing difference (τ) based on additional information regarding a set of targets. The additional information may be received from a set of target vehicles/devices. The information may include radar sensing information from at least one other vehicle and/or radar device. The additional information, in some aspects, may include information regarding (1) a bounding box associated with the target, (2) a location associated with the target, (3) a location associated with the target and an accuracy of the location information, (4) an orientation associated with the target, (5) an orientation associated with the target and an accuracy of the orientation information, (6) a nature of the target, (7) a heading associated with the target, (8) a heading associated with the target and an accuracy of the heading information, (9) a size of the target, (10) dimensions associated with the target, (11) a velocity associated with the target, and/or (12) a velocity associated with the target and an accuracy of the velocity information.

As illustrated in diagram 400, the vehicles 402 and 404 may independently generate a set of radar points 470 and 480, respectively, in a radar point cloud. An independently generated set of radar points 470 (or 480) may include radar points (e.g., 412 (or 422)) generated by the vehicle 402 (or 404) based on receiving reflections of radar waveform transmissions 410 (or 420) from the vehicle 402 (or 404) that are associated with a known transmission timing. An independently generated set of radar points 470 (and 480) may include subsets of radar points (e.g., candidate radar point subsets 450, 452, 454, and 456 (or 450, 451, and 453)) generated by the vehicle 402 (or 404) based on receiving specular reflections of radar waveform transmissions 430 from a different vehicle 404 (or 402) that may be associated with a particular transmission-timing-difference (τ) candidate and/or with a particular relationship between a distance to the target and τ. Information regarding the generated sets of radar points 470 and 480 may be transmitted by vehicles 402 and 404 and may be received by other vehicles (e.g., 404 and 402). Vehicle 402 (and 404) may receive the information regarding the set of generated radar points 480 (and 470) and may use the received information regarding the set of generated radar points 480 along with the set of generated radar points 470 to determine the transmit timing difference (τ) between a transmit timing of the first radar waveform and a transmit timing of the second radar waveform. The determination of τ may be based on identifying a τ that is consistent with both sets of generated radar points 470 and 480. For example, the information regarding the set of generated radar points 480 may include a location associated with the vehicle 404 (or a radar device of vehicle 404) that may be used to determine that the set of radar points 450 is consistent with a particular value of τ.

Alternatively, or additionally, the first vehicle 402 and the second vehicle 404 may independently determine a value for τ based on other information available to the vehicle (e.g., from other sensors of the vehicle, from at least one target vehicle, etc.). The independently determined values for τ may be the value that is most consistent with any or all of the reflections with a known timing (e.g., radar points 412), information from other sensors of the vehicle, or information (e.g., bounding box information) received from at least one target device. For example, vehicles 402 and 404 may identify a τ associated with radar points 450 based on a likelihood that a vehicle will be roughly rectangular and the radar points 412 or 422 are likely to represent one edge of a rectangle where the closest radar point is likely to roughly coincide with a vertex/corner of the bounding box that can be used to define another edge that coincides with a set of candidate radar points 450. The independently determined values for τ may be transmitted by the first vehicle 402 and the second vehicle 404 and may be received by the second vehicle 404 and the first vehicle 402, respectively.

Figure 5:
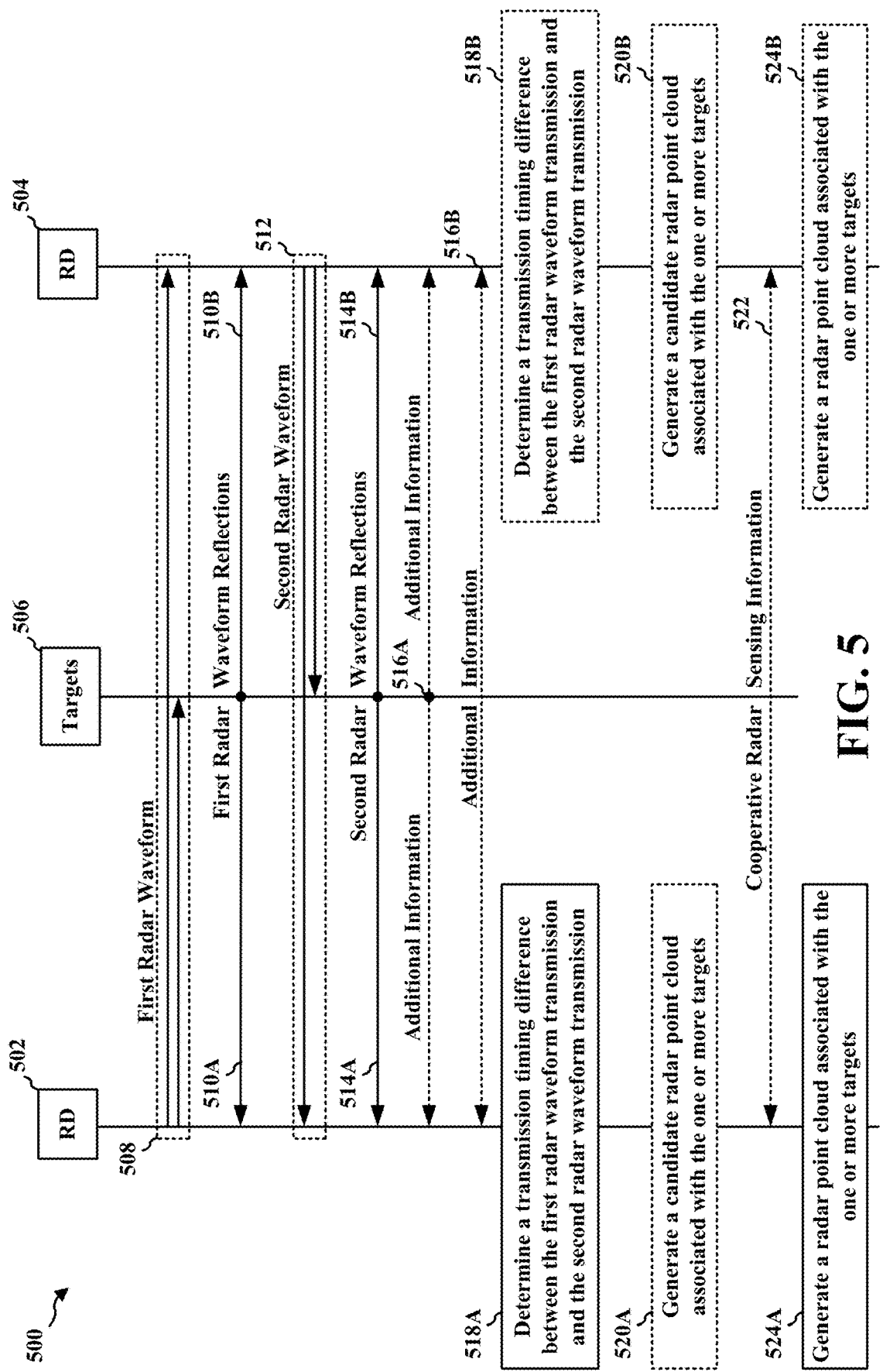
FIG. 5 is a call flow diagram of a method of cooperative radar sensing.

FIG. 5 is a call flow diagram 500 of a method of cooperative radar sensing. Diagram 500 includes a first radar device (RD) 502, a second RD 504, and one or more targets 506. Optional operations or transmissions are depicted with dotted lines. A first RD 502 may transmit a first radar waveform 508. The second RD 504 may receive the transmitted first radar waveform 508 directly from RD 502. The first radar waveform 508 may also be reflected from the one or more targets 506. The first RD 502 may receive reflections 510A of the first radar waveform 508 from the one or more targets 506. The second RD 504 may receive (specular) reflections 510B of the first radar waveform 508. For example, referring to FIG. 4, vehicle 402 may transmit a first radar waveform, e.g., 410, 430, and 440, corresponding to first radar waveform 508. A first radar device (e.g., RD 502) of vehicle 402 may receive reflections (e.g., 510A) of a first set of radar transmissions 410 from a target 406 at points associated with radar points 412. A second radar device (e.g., RD 504) of vehicle 404 may receive (1) reflections, from target device 406 (e.g., targets 506), of a third set of radar transmissions 430 transmitted from the first radar device (e.g., RD 502) of vehicle 402, and (2) direct radar transmission 440 from the first radar device (e.g., RD 502) of vehicle 402.

A second RD 504 may transmit a second radar waveform 512. The first RD 502 may receive the transmitted second radar waveform 512 directly from RD 504. The second radar waveform 512 may also be reflected from one or more targets 506. The second RD 504 may receive reflections 514B of the second radar waveform 512 from the one or more targets 506. The first RD 502 may receive (specular) reflections 514A of the first radar waveform 508. For example, referring to FIG. 4, vehicle 404 may transmit a second radar waveform, e.g., 420, 430, and 440, corresponding to second radar waveform 512. The second radar device (e.g., RD 504) of vehicle 404 may receive reflections (e.g., 514B) of the set of radar transmissions 420 from a target 406 at points associated with radar points 422. The first radar device (e.g., RD 502) of vehicle 402 may receive (1) reflections, from target device 406 (e.g., targets 506), of the set of radar transmissions 430 transmitted from the second radar device (e.g., RD 504) of vehicle 404, and (2) direct radar transmission 440 from the first radar device (e.g., RD 504) of vehicle 404.

The RDs 502 and/or 504 may receive additional information 516A regarding a subset (or the entire set) of the one or more targets from at least one target in the one or more targets. The additional information relating to any of the particular targets in the subset of targets may include information relating to the location of a target. For example, the additional information may include any combination of information regarding (1) a bounding box associated with the target, (2) a location associated with the target, and/or (3) an accuracy of the bounding box or location information. The additional information relating to any of the particular targets in the subset of targets may include information relating to the orientation or motion of a target. For example, the additional information, in some aspects, may additionally, or alternatively, include any combination of information regarding (1) an orientation associated with the target, (2) a heading associated with the target, (3) a speed or velocity (e.g., a vector quantity including speed and direction) associated with the target, and/or (4) an accuracy of the orientation, heading, or speed/velocity information. The additional information relating to any of the particular targets in the subset of targets may include information relating to the nature or size of the target. For example, the additional information, in some aspects, may additionally, or alternatively, include any combination of information regarding (1) a nature of the target (e.g., a sedan, an SUV, a truck, an 18-wheeler, a motorcycle, etc.), (2) a size of the target, and/or (3) dimensions associated with the target.

The RD 502 may receive the additional information 516A from at least one target in the one or more targets as a basic safety message (BSM). In some aspects, the RD 502 may receive the additional information 516A in a sensor sharing message from at least one target in the one or more targets. The RD 502 may also receive additional information 516A from other sensors associated with RD 502 (e.g., sensors associated with a same vehicle as RD 502).

In some aspects, the RD 502 and/or the RD 504 may transmit and/or receive additional data 516B regarding the RD 502 and/or the RD 504. The additional data 516B may include information regarding (1) a bounding box associated with the second radar device and (2) a location of a radar transmitter of the second radar device within the bounding box. Based on the received first and second radar waveform reflections 510A and 514A and any additional information 516A and 516B, the first RD 502 may determine 518A a transmit timing difference between a transmit timing of the first radar waveform transmission and a transmit timing of the second radar waveform transmission. The second RD 504, in some aspects, may also determine 518B, based on the received first and second radar waveform reflections 510B and 514B and any additional information 516A and 516B, a transmit timing difference between a transmit timing of the first radar waveform transmission and a transmit timing of the second radar waveform transmission.

Based on the determined 518A (or 518B) transmit timing difference, the first RD 502 (or the second RD 504) may generate 520A (or 520B) a candidate radar point cloud associated with the one or more targets. For example, referring to FIG. 4, the vehicle 402 (or the vehicle 404) may generate a candidate radar point cloud 470 (or 480). As described in relation to FIG. 4, a radar point cloud 470 (or 480) that a vehicle 402 (or a vehicle 404) generates may include a first set of radar points 412 based on receiving radar waveform reflections from its own radar waveform transmissions (e.g., with a known transmission time) and a second set of candidate radar points (e.g., any or all of points 450, 452, 454, and 456) based on receiving radar waveform reflections from another vehicle's radar waveform transmissions 430 (e.g., with an unknown transmission time).

In some aspects, the first RD 502 and/or the second RD 504 may receive and/or transmit cooperative radar sensing information 522. The cooperative radar sensing information 522 may be received by the first RD 502 via a SL from the second RD 504 or via a base station (e.g., relayed from the second RD 504). The cooperative radar sensing information 522 may include a determined transmission timing difference, τ. The first RD 502 (or the second RD 504) may determine a value for τ based on the first radar waveform reflections 510A (or 510B), the second radar waveform reflections 514A (or 514B), and any additional information 516A or 516B received at the first RD 502 (or the second RD 504). In some aspects, the cooperative radar sensing information 522 received by the first RD 502 (or the second RD 504) may additionally, or alternatively, include information regarding radar points and/or candidate radar points generated by the second RD 504 (or the first RD 502). In some aspects, the first RD 502 (or the second RD 504) may receive a generated 520B (or 520A) candidate radar point cloud and transmit the generated set of candidate radar points before determining 518A (or 518B) the transmission timing difference. In some aspects, the first RD 502 (or the second RD 504) may determine 518A (or 518B) the transmission timing difference based on the first radar waveform reflections 510A (or 510B), the second radar waveform reflections 514A (or 514B), any additional information 516A or 516B received at the first RD 502 (or the second RD 504), and a candidate radar point cloud received by the first RD 502 (or the second RD 504).

The first RD 502 may generate 524A a radar point cloud based on (i) the received one or more reflections of the first transmitted radar waveform 510A, (ii) the received at least one of the direct second radar waveform transmission 512 from the second radar device and the reflected second radar waveform transmission 514A from the one or more targets 506, and (iii) the determined timing difference. Generating 524A the radar point cloud may further be based on at least one of (i) a determined 518B transmission timing difference received from the second RD 504 and (ii) a generated 520B candidate radar point cloud associated with the one or more targets 506 received from the second RD 504. For example, referring to FIG. 4, the vehicle 402 may generate radar point cloud 490 based on (i) the received one or more reflections of the first transmitted radar waveform 410 associated with radar points 412, (ii) the received at least one of the direct second radar waveform transmission 440 from the second radar device 404 (e.g., associated with point 460) and the reflected second radar waveform transmission 430 from the one or more targets 406 (e.g., associated with radar point candidates 450, 452, 454, and 456), and (iii) the determined timing difference. Generating radar point cloud 490 may further be based on a determined transmission timing difference (e.g., based on identifying candidate radar points 450 as being the most likely location of the target) and/or the candidate radar point cloud 480 associated with the one or more targets (e.g., target 406) received from the vehicle 404 (e.g., as discussed in relation to FIG. 4).

The second RD 504 may generate 524B a radar point cloud based on (i) the received one or more reflections of the second transmitted radar waveform 514B, (ii) the received at least one of the direct first radar waveform transmission 508 from the first radar device and the reflected first radar waveform transmission 510B from the one or more targets 506, and (iii) the determined timing difference. Generating 524B the radar point cloud may further be based on at least one of (i) a determined 518A transmission timing difference received from the first RD 502 and (ii) a generated 520A candidate radar point cloud associated with the one or more targets 506 received from the first RD 502. For example, referring to FIG. 4, the vehicle 404 may generate radar point cloud 490 based on (i) the received one or more reflections of the second transmitted radar waveform 420 associated with radar points 422, (ii) the received at least one of the direct first radar waveform transmission 440 from the first radar device 402 (e.g., associated with point 462) and the reflected first radar waveform transmission 430 from the one or more targets 406 (e.g., associated with radar point candidates 450, 451, and 453), and (iii) the determined timing difference. Generating radar point cloud 490 may further be based on a determined transmission timing difference (e.g., based on identifying candidate radar points 450 as being the most likely location of the target) and/or the candidate radar point cloud 470 associated with the one or more targets (e.g., target 406) received from the vehicle 402 (e.g., as discussed in relation to FIG. 4).

Figure 6:
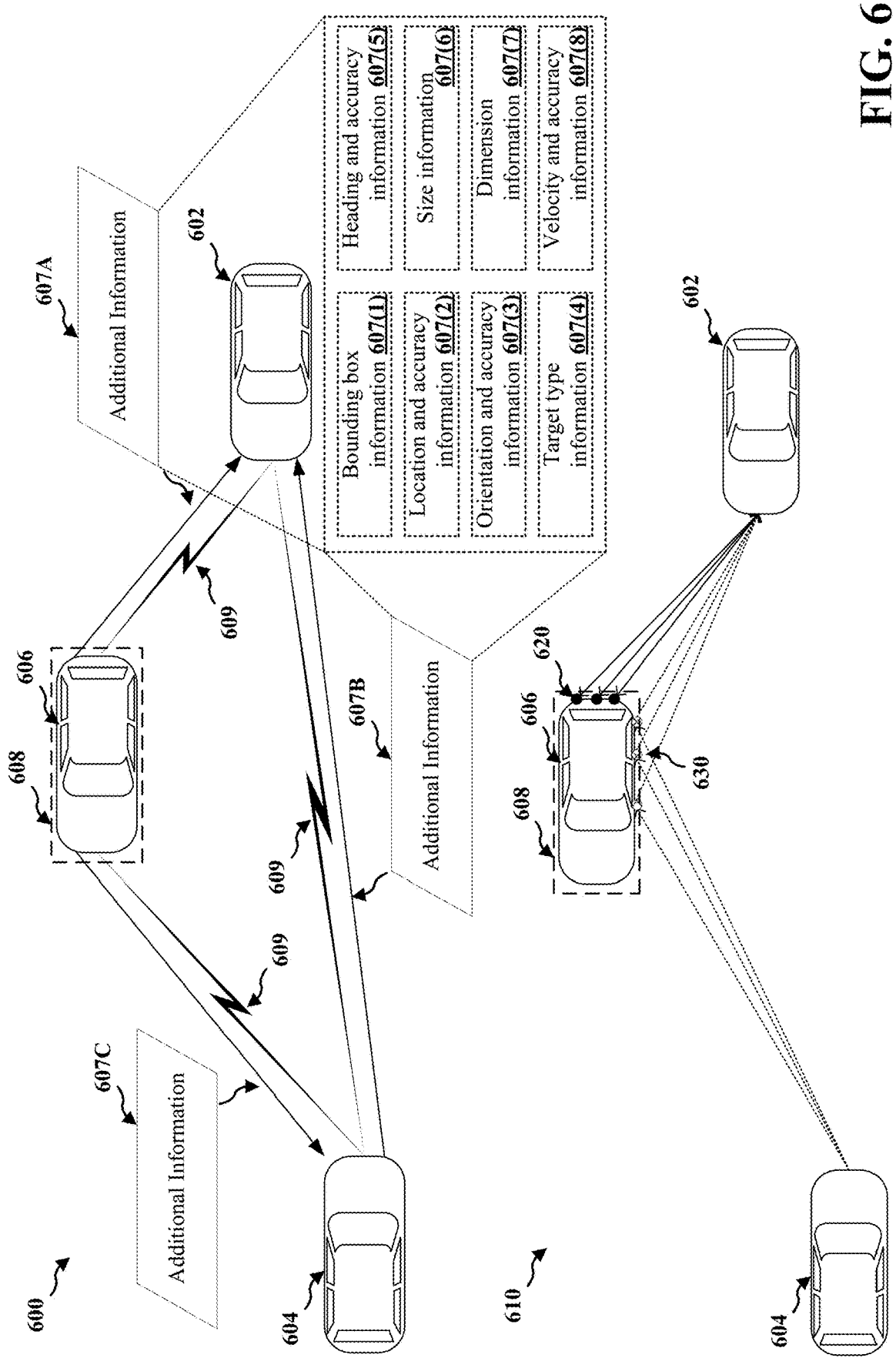
FIG. 6 includes a diagram illustrating additional information that may be received at a vehicle and a diagram of the received additional information being used to generate a radar point cloud.

FIG. 6 includes a diagram 600 illustrating additional information 607A/607B that may be received at a vehicle 602 and a diagram 610 of the received additional information being used to generate a radar point cloud. Diagram 600 illustrates a vehicle 602 in communication with a target vehicle 606 (e.g., over a SL 609). The target vehicle may be associated with a bounding box 608 that roughly defines the boundaries of the target vehicle. Diagram 600 illustrates that target vehicle 606 may transmit, and vehicle 602 may receive, additional information 607A regarding target 606. Diagram 600 further illustrates that target vehicle 604 may transmit, and vehicle 602 may receive, additional information 607B regarding target 604. Diagram 600 further illustrates that vehicle 606 may transmit, and vehicle 604 may receive, additional information 607C. The additional information 607A/607B/607C may include bounding box information 607(1) regarding a box (e.g., 608) that approximates the size and shape of the target 606/604. The additional information 607A/607B/607C may include location and accuracy information 607(2) identifying a location of the target (e.g., as defined by a global positioning system (GPS), or in relation to some other reference frame shared by the target vehicle 606/604 and the vehicle 602) and, in some aspects, identifying the accuracy and/or precision of the location information (e.g., accurate to within 1 m, or 15 cm; or that the location information is provided in units of 1 m, 10 cm, etc.). The additional information 607A/607B/607C may include orientation and accuracy information 607(3) identifying an orientation of the target (e.g., a value of an angle measured from a reference orientation such as "north" or an angle measured relative to other objects such as the vehicle 602) and, in some aspects, identifying the accuracy and/or precision of the orientation information (e.g., accurate to within 5 degrees or that the orientation information is provided in units of 1 degree, or 0.25 radians, etc.).

The additional information 607A/607B/607C may include target type information 607(4) identifying the nature of the target 606/604, e.g., that the target is an 18-wheeler, a truck, a van, an SUV, a sedan, a motorcycle, or a mobile device associated with a pedestrian. The additional information 607A/607B/607C may include heading and accuracy information 607(5) identifying a direction that the target 606/604 is headed (e.g., a compass direction that may be different from the orientation, e.g., during a turn) and, in some aspects identifying the accuracy and/or precision of the heading information (e.g., accurate to within 5 degrees or that the heading information is provided in units of 1 degree, or 0.25 radians, etc.). The additional information 607A/607B may include size information 607(6) regarding a size of the target 606/604. The additional information 607A/607B/607C may include dimension information 607(7) identifying at least one of a length, width, or height associated with the target 606/604 and, in some aspects, may provide more specific information than bounding box information 607(1). The additional information 607A/607B/607C may include velocity and accuracy information 607(8) identifying a speed or velocity (e.g., a speed and a direction) of the target 606/604 and, in some aspects, identifying the accuracy and/or precision of the speed or velocity information (e.g., that a speed value is accurate to within 5 mph or 3 km/h and that it is measured in 1 mph or 5 km/h increments; or that a velocity is accurate to within 5 mph and 5 degrees and is provided in units of 1 mph and 1 degree, or 5 km/h and 0.25 radians, etc.).

Based on the received additional information 607A/607B, received reflections of radar waveforms transmitted by vehicle 602 and reflecting from target 606 at points 620, and received specular reflections from the target 606 at points 630, the vehicle 602 may generate a radar point cloud. As illustrated, the additional information 607A/607B may include at least one of bounding box information 607(1), size information 607(6), or dimension information 607(7). The additional information 607A may allow the vehicle 602 to define a bounding box 608 and to identify (e.g., associate) the received reflected transmissions with points on the bounding box 608 (e.g., 620 and 630).

Figure 7:
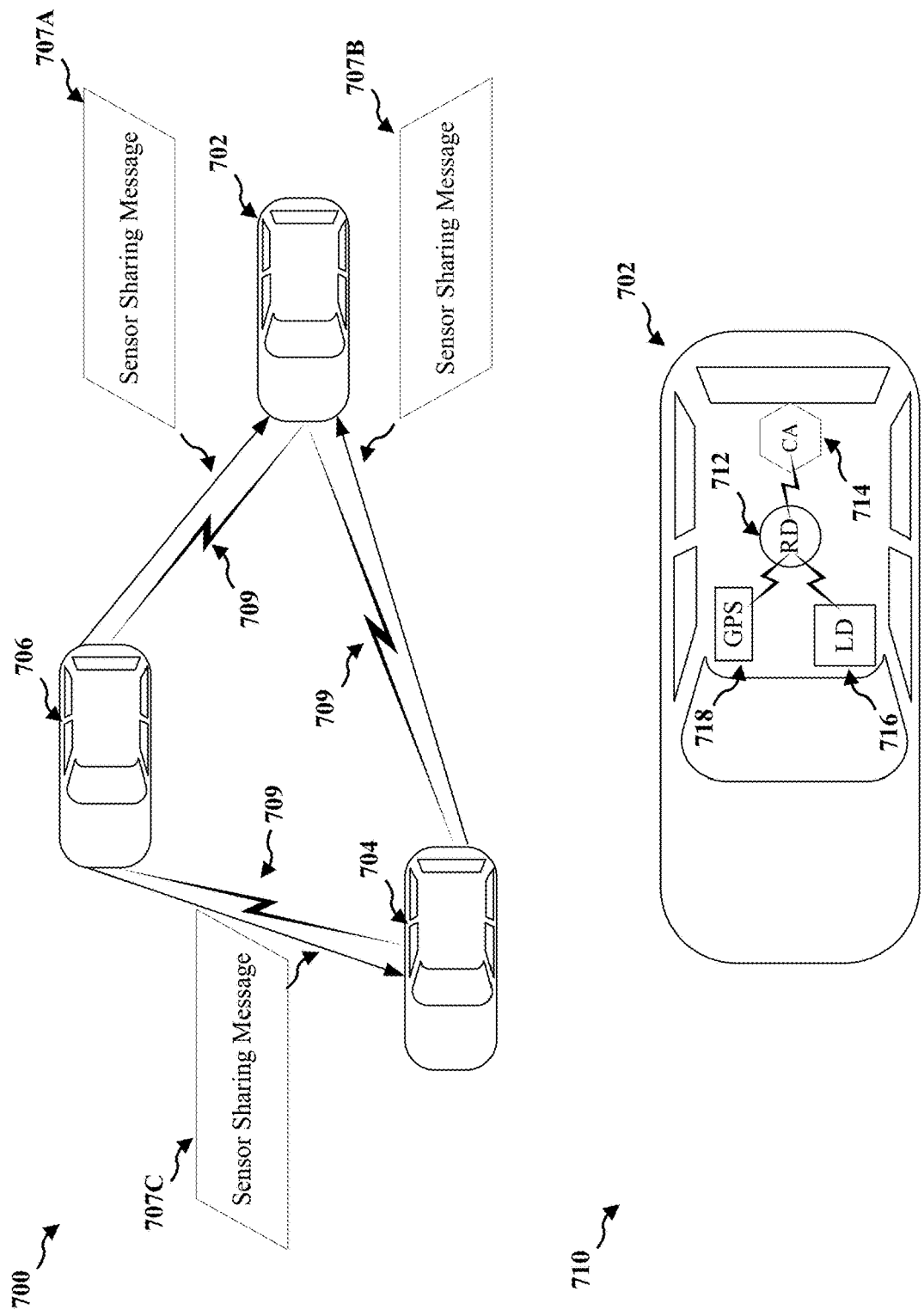
FIG. 7 includes diagrams illustrating a first vehicle that may receive sensor data from sensors associated with other target vehicles or associated with the first vehicle.

FIG. 7 includes diagrams 700 and 710 illustrating a first vehicle 702 that may receive sensor data from sensors associated with other target vehicles or associated with the first vehicle 702. Diagram 700 illustrates two vehicles 704 and 706 that communicate with the first vehicle 702 via connections 709 (e.g., SLs or a V2V connection relayed through a base station). The first vehicle 702 may receive sensor sharing information 707A and 707B from vehicles 706 and 704, respectively. The second vehicle 704 may receive sensor sharing information 707C from vehicles 706. The sensor sharing data may include information regarding data collected by sensors of (e.g., associated with) the other vehicles 704 and 706. For example, vehicle 704 and/or 706 may be equipped with a lidar device, a camera array, a GPS, a sonar device, etc. for performing sensing processes and data from those devices/sensors may be transmitted from vehicle 704 and/or 706 and received at vehicle 702. The sensor sharing messages 707A and 707B may include a set of data derived from the sensors associated with vehicle 706 and 704, respectively. For example, sensor sharing message 707A may include an identification of objects (e.g., a location of a detected object, a bounding box associated with a detected object, etc.) in the vicinity of vehicle 706. In some aspects, sensor sharing messages 707A and 707B may include raw sensor data for aggregation and interpretation at a receiving device (e.g., vehicle 702 may receive raw sensor data from vehicles 704 and 706, aggregate the data, and perform an analysis on the aggregated data).

Diagram 710 illustrates a radar device (RD) 712 of vehicle 702 receiving information from other sensors (e.g., camera array (CA) 714, lidar device (LD) 716, GPS 718, etc.) of the vehicle 712. The information received from other sensors may be associated with the received first and second radar waveforms in order to determine the transmission timing difference and/or to generate the radar point cloud. For example, a lidar device (e.g., LD 716) may detect an object 10 meters away and/or a camera array (e.g., CA 714) may identify a car in a particular direction and at an approximate distance (e.g., based on the number of pixels or amount of a frame associated with the identified car). The radar device (e.g., RD 712) may receive the sensor information and determine the transmission timing difference and/or generate the radar point cloud to be consistent with the received sensor information.

In some aspects, the sensors provide data to a same computing device that performs analysis of the data from the sensors. The computing device may independently process data from a first set of the sensors and may process data from the sensors in a second set of sensors in conjunction with data from additional sensors (or the results of processing the data from the additional sensors). The first and second set of sensors may include a same sensor, such that data from the sensor in the first and second sets of sensors is first processed independently and then processed in conjunction with data from other sensors. In some aspects, the results of processing data from the first set of sensors is used in processing data from the second set of sensors.

Figure 8:
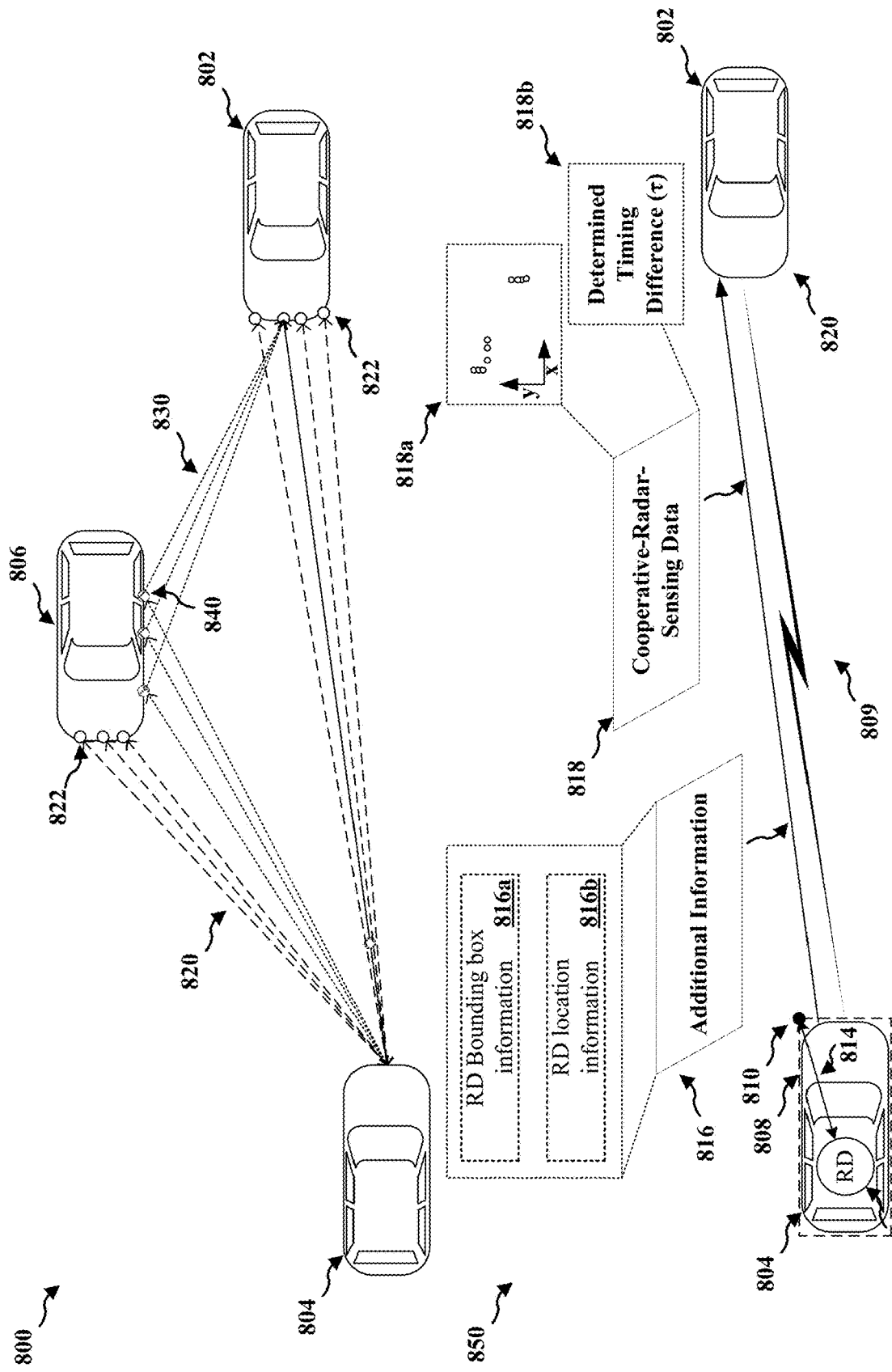
FIG. 8 includes diagrams illustrating a vehicle participating in cooperative radar sensing with another vehicle.

FIG. 8 includes diagrams 800 and 850 illustrating a vehicle 802 participating in cooperative radar sensing with another vehicle 804. Vehicle 804 may transmit a second radar waveform 820 and may receive reflections of the second radar waveform 822 from sets of points 822 associated with one or more targets (e.g., vehicles 802 and 806). Vehicle 804 may also receive a first radar waveform 830 transmitted by a vehicle 802 and reflected from points 840 from target 806.

In diagram 850, vehicle 804 is associated with a bounding box 808, a location 810 (e.g., a point on bounding box 808), a radar device 812, and a radar device displacement vector 814 (e.g., a measure of the location of the RD 812 in relation to the location 810). Vehicle 804 may communicate with vehicle 802 via a connection 809 (e.g., a sidelink or relayed connection). Vehicle 804 may transmit, and vehicle 802 may receive, additional information 816 and/or cooperative-radar-sensing data 818. Additional information 816 may include RD bounding box information 816a identifying a bounding box 808 of the vehicle 804. The RD bounding box information 808 may include a particular location 810 and dimensions of the bounding box 808. Additional information 816 may include radar device (RD) location information 816b that identifies a location of the radar device 812 within a bounding box. The radar device location information 816b may identify the location of the radar device 812 by identifying a displacement (e.g., via a displacement vector 814) of the radar device 812 from a particular location (e.g., location 810) used to identify the location of the vehicle (e.g., vehicle 804) or a bounding box of the vehicle (e.g., bounding box 808).

The vehicle 804 may transmit, and vehicle 802 may receive, cooperative-radar-sensing data 818. Cooperative-radar-sensing 818 may include a set of radar points (e.g., a radar point cloud, or sets of candidate radar points) 818a and/or a determined transmission timing difference (τ) 818b. The set of radar points 818a may include a set of radar points that are identified by the vehicle 804 based on radar waveforms 820 transmitted by vehicle 804. The set of radar points 818a may include sets of candidate radar points (e.g., radar points 840) associated with radar waveform transmissions 830 from vehicle 402 (as described in relation to FIG. 4). The cooperative-radar-sensing information 818 may include a determined transmission timing difference 818b based on information received at the vehicle 804. For example, referring to FIG. 5, a radar device 504 may determine 518B a transmission timing difference (τ) based on the reception of the first radar waveform 508, the first radar waveform reflection 510B, the second radar waveform reflections 514B, and/or additional information 516A and 516B.

Figure 9:
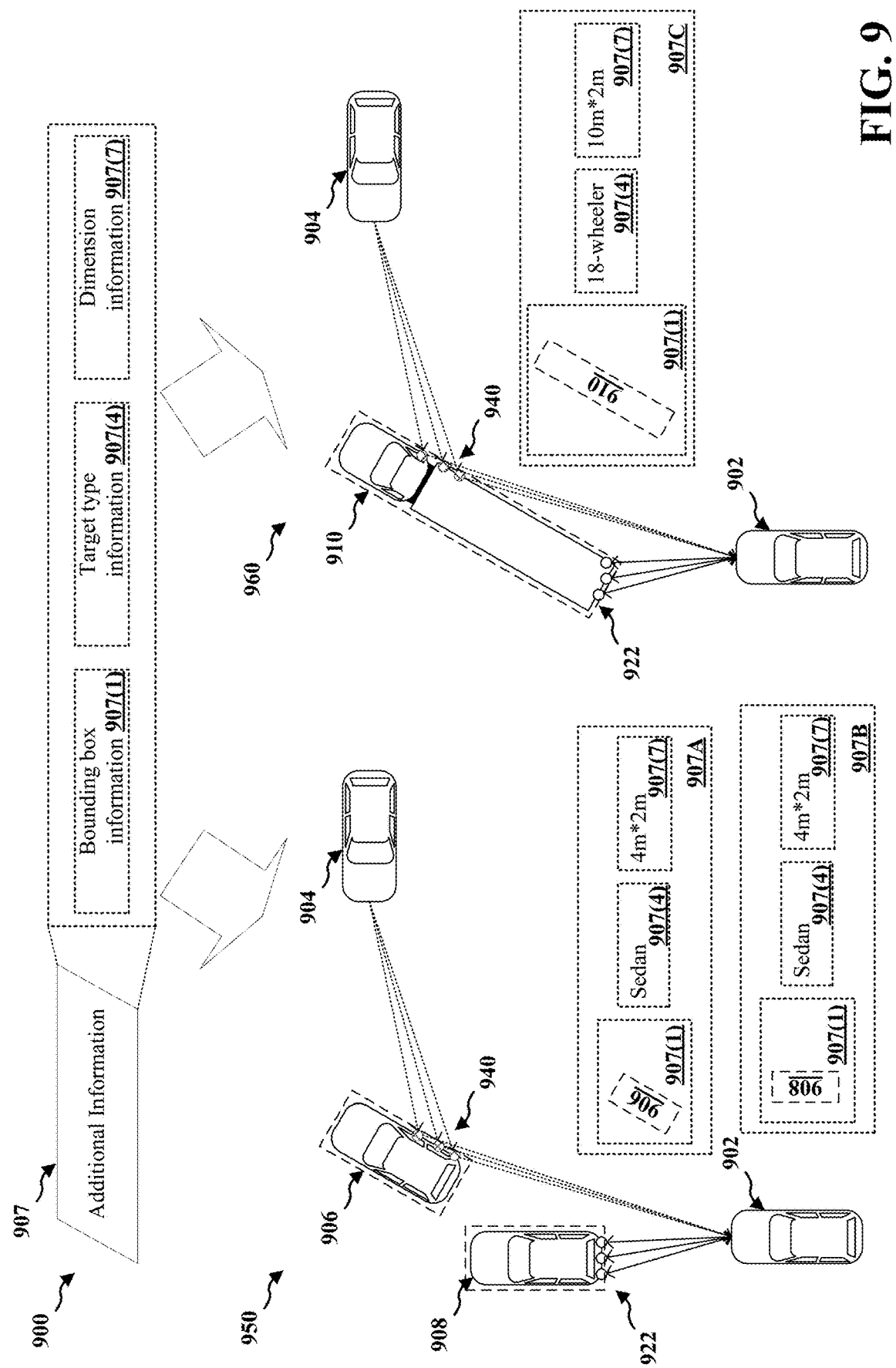
FIG. 9 is a diagram of the use of additional information to distinguish between scenarios depicted in a first diagram and a second diagram.

FIG. 9 is a diagram 900 of the use of additional information 907 to distinguish between scenarios depicted in a first diagram 950 and a second diagram 960. As illustrated in diagram 900, a vehicle 902 may identify radar points 922 and 940 which are consistent with either a set of two target sedans (e.g., vehicles) 906 and 908 or with a single target 18-wheeler (e.g., vehicle) 910. The vehicle 902 may also receive additional information 907 that can enable the vehicle to determine the correct interpretation of the radar points 922 and 940. The correct interpretation may be based on any or all of bounding box information 907(1), target type information 907(4), and/or dimension information 907(7). For example, if the vehicle receives (e.g., from the target vehicles or from another source) additional information 907A and 907B regarding vehicles 906 and 908, respectively, the vehicle 902 may interpret the radar points 922 and 940 as being associated with two separate targets based on receiving a number of bounding boxes, a target type, and/or dimensions that are consistent with two targets (and inconsistent with one target). If, however, the vehicle 902 receives additional information 907C (e.g., from vehicle 910 or another source) the vehicle may interpret the radar points 922 and 940 as being associated with a single target targets based on receiving a number of bounding boxes, a target type, and/or dimensions that are consistent with a single target (and inconsistent with multiple targets). For example, two identified bounding boxes, a "sedan" target type, or dimension information identifying a vehicle that is 4 m long and 2 m wide may be consistent with two targets (and inconsistent with a single sedan) based on a distance between the radar points 940 and 922. On the other hand, one identified bounding box, an "18-wheeler" target type, or dimension information identifying a vehicle that is 10 m long and 2 m wide may be consistent with a single target (and inconsistent with multiple sedans) based on the location of the radar points 940 and 922.

Figure 10:
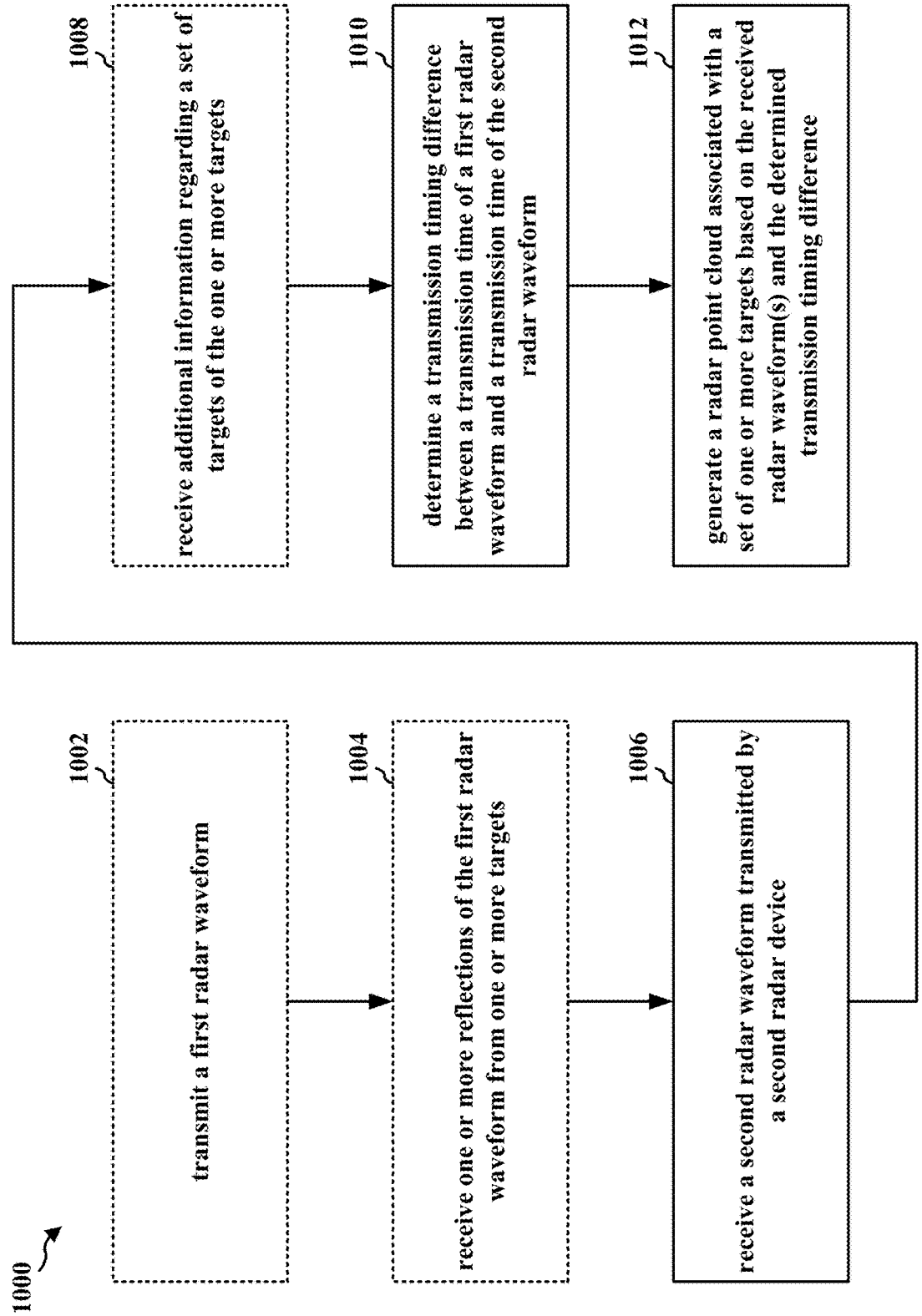
FIG. 10 is a flowchart of a method of cooperative radar sensing.

FIG. 10 is a flowchart 1000 of a method of cooperative radar sensing. The method may be performed by a first radar device (e.g., RD 502; RD 712; RD 812) associated with a UE (e.g., the vehicle 104; the vehicle 402/602/702/802/902; the apparatus 1202). Optional steps are indicated by dotted lines. At 1002, the first radar device may transmit a first radar waveform. The first radar waveform may have a particular 'signature' (e.g., a feature of the radar waveform transmission that may be used to distinguish one radar waveform from another such as an encoded radar identifier). For example, referring to FIGS. 4 and 5, a first radar device (e.g., RD 502) associated with a first vehicle (e.g., vehicle 402) may transmit a first radar waveform (e.g., radar waveform 410 or 508). For example, 1002 may be performed by radar waveform transmission component 1240.

At 1004, the first radar device may receive one or more reflections of the first radar waveform from one or more targets. The one or more reflections of the first radar waveform may be received at different times indicating the distance to a target of the one or more targets. The received reflections may also be associated with a particular reception direction (e.g., angle) that indicates the direction of the target. The timing of the received reflections and the directions associated with the received reflections may identify a radar point for inclusion in a radar point cloud generated at 1012 discussed below. For example, referring to FIGS. 4-6, a first radar device (e.g., RD 502) associated with a vehicle (e.g., vehicle 402/602) may receive reflections (e.g., 510A) of a first radar waveform transmission (e.g., 410/508) from a set of points (e.g., 412/620) associated with one or more targets (e.g., vehicles 404, 406, and 606). The first radar waveform reflections may be identified by a signature (e.g., an encoded identifier) of the first radar waveform. For example, 1004 may be performed by radar waveform reception component 1242.

At 1006, the first radar device may receive a second radar waveform transmitted by a second radar device. The second radar device, in some aspects, may participate in cooperative radar sensing with the first radar device. In some aspects, the second radar waveform is at least one of a second radar waveform received directly from the second radar device and a second radar waveform reflected from the one or more targets. The second radar waveform may have a particular 'signature' that is different from the signature of the first radar waveform. The transmission timing (or a transmission timing difference) of the second radar waveform may not be known (e.g., based on a synchronization) at the first radar device with sufficient accuracy to enable the first radar device to determine a distance traveled by the second radar waveform before being received at the first radar device with a desired accuracy. For example, radar transmissions of different radar devices may be synchronized within 0.5 μs which gives a range of distance values of approximately 150 meters which is greater than a desired accuracy of approximately 15 cm. For example, referring to FIGS. 4-6, a radar device (e.g., RD 502) associated with a first vehicle (e.g., vehicle 402 or 602) may receive second waveform transmissions (e.g., 512) from a second radar device (e.g., 504) associated with a second vehicle (e.g., vehicle 404 or 604). The received second radar waveform may include direct transmissions (e.g., 440 or 512) and/or reflections of the second waveform (e.g., 514A) from a set of points (e.g., 450 or 630) associated with one or more targets (e.g., 406, 506, 606). For example, 1006 may be performed by radar waveform reception component 1242.

At 1008, the first radar device may receive additional information regarding a set of targets of the one or more targets. The additional information regarding the set of targets may include, for each target in the set of targets, information regarding (1) a bounding box associated with the target, (2) a location associated with the target, (3) a location associated with the target and an accuracy of the location information, (4) an orientation associated with the target, (5) an orientation associated with the target and an accuracy of the orientation information, (6) a nature of the target, (7) a heading associated with the target, (8) a heading associated with the target and an accuracy of the heading information, (9) a size of the target, (10) dimensions associated with the target, (11) a velocity associated with the target, and/or (12) a velocity associated with the target and an accuracy of the velocity information. The information may be received by the first radar device in one or more of (1) information included in BSMs received from the one or more targets, (2) information included in sensor sharing messages received from the one or more targets, and (3) information from other sensors associated with the first radar device. For example, referring to FIGS. 5-8, a first radar device (e.g., RD 502, 712, 812) associated with a first vehicle (e.g., vehicle 602, 702, or 802) may receive additional information (e.g., additional information 516A/516B, 607A/607B, or 816) from one or more targets (e.g., targets 506, vehicle 604, vehicle 606, or vehicle 804) or from additional sensors (e.g., CA 714, LD 716, and/or GPS 718) associated with the same vehicle (e.g., vehicle 702).

Alternatively, or additionally, the additional information may be received from a second radar device participating in cooperative radar sensing. The additional information received from the second radar device may be received via a sidelink or a base station (e.g., relayed from, or retransmitted by a base station). The additional information received from the second radar device may include the additional information described above and may also include information for performing cooperative radar sensing such as information regarding one or more of (1) a RD bounding box associated with the second radar device, (2) a location of a radar transmitter of the second radar device, (3) a transmission timing difference determined by the second radar device, and (4) one or more candidate radar point clouds generated by the second radar device. For example, referring to FIGS. 5 and 8, the first radar device (e.g., RD 502) associated with a first vehicle (e.g., 802) may receive additional information (e.g., additional information 516B, additional data 816, or cooperative-radar-sensing data 818) from a second radar device (e.g., RD 504) associated with a second vehicle (e.g., vehicle 804). For example, 1008 may be performed by additional information communication component 1244.

At 1010, the first radar device may determine a transmission timing difference between a transmission timing of a first radar waveform (e.g., at 1002) and a transmission timing of the second radar waveform (e.g., the second radar waveform received at 1006). The first radar device may determine, at 1010, the transmission timing difference based on the first radar waveform transmission that the first radar device may receive at 1004. The first radar device may further determine, at 1010, the transmission timing difference based on the second radar waveform transmissions that the first radar device may receive at 1006. The first radar device may also determine, at 1010, the transmission timing difference based on the additional information that the first radar device may receive at 1008. The first radar device may associate the additional information received at 1008 with the second radar waveform received at 1006 and may determine, at 1010, the transmission timing difference based on the association of the additional information with the received second radar waveform. The determined transmission timing difference may be used to identify a path length to the second radar device's transmitter to generate, at 1012, a radar point cloud.

For example, referring to FIGS. 4-8, a first radar device (e.g., RDs 502, 712, or 812) associated with a first vehicle (e.g., vehicles 402, 602, 702, or 802) may receive additional information (e.g., the radar point cloud 480 including sets of candidate radar points (e.g., radar point sets 450, 451, and 453), additional information 607A/607B, sensor sharing messages 707A/707B, additional information 816, and cooperative-radar-sensing data 818 from a set of targets 404/406, 504/506, 604/606, 704/706, 804/806 (including a device/vehicle 404, 504, or 804 participating in cooperative radar sensing). The first radar device (e.g., RD 502, 712, or 812) or vehicles associated with the first radar device (e.g., vehicles 402, 602, 702, and 802), may associate the additional information with the received first radar waveform and/or the received second radar waveform 607A/607B, 707A/707B, 816, and/or 818. The association may allow the first radar device to identify a set of radar points associated with a target based on a particular set of candidate radar points that is consistent with a particular transmission timing difference. For example, 1010 may be performed by transmission timing difference determination component 1246.

At 1012, the first radar device may generate a radar point cloud associated with one or more targets based on the received second radar waveform and the determined transmission timing difference. The first radar device may further generate, at 1012, the radar point cloud based on the received first radar waveform and the additional information. In some aspects, the first radar device may generate, at 1012, the radar point cloud based on associating the additional information with the received first radar waveform and/or second radar waveform. For example, referring to FIGS. 4-9, a first radar device (e.g., RD 502, 712, or 812) associated with a first vehicle (e.g., vehicle 402, 602, 702, 802, or 902) may generate (e.g., at 524A) a radar point cloud (e.g., radar point cloud 490). The generated radar point cloud (e.g., radar point cloud 490) may be generated based on (1) reflections (e.g., 510A) of a first radar waveform from one or more targets (e.g., from points 412, 620, and 922 associated with vehicles 404/406, 606, and 908/910, respectively), (2) reflections (e.g., 514A) of a second radar waveform from one or more targets (e.g., from points 450, 630, 840, and 940 associated with vehicles 406, 606, 806, and 906/910, respectively), (3) a second radar waveform (e.g., 512) received directly from a second radar device (e.g., RD 504, 712, or 812), and (4) additional information (e.g., the set of radar points 480; additional information 516A/516B, 607A/607B, 707A/707B, 816, 907A/907B/907C; and/or cooperative-radar-sensing data 818). For example, 1012 may be performed by radar point cloud generation component 1248.

The first radar waveforms, second radar waveforms, and additional information may be aggregated by the first radar device to generate, at 1012, the radar point cloud that is most consistent with the different received data. For example, referring to FIGS. 4-9, a first radar device (e.g., RD 502, 712, or 812) associated with a first vehicle (e.g., 402, 602, 702, 802, or 902) may generate a radar point cloud (e.g., 490) based on a determined transmission timing difference, or based on a set of candidate radar points, that is consistent with additional information received regarding one or more targets (e.g., the set of radar points 480; additional information 516A/516B, 607A/607B, 707A/707B, 816, 907A/907B/907C; and/or cooperative-radar-sensing data 818).

Figure 11:
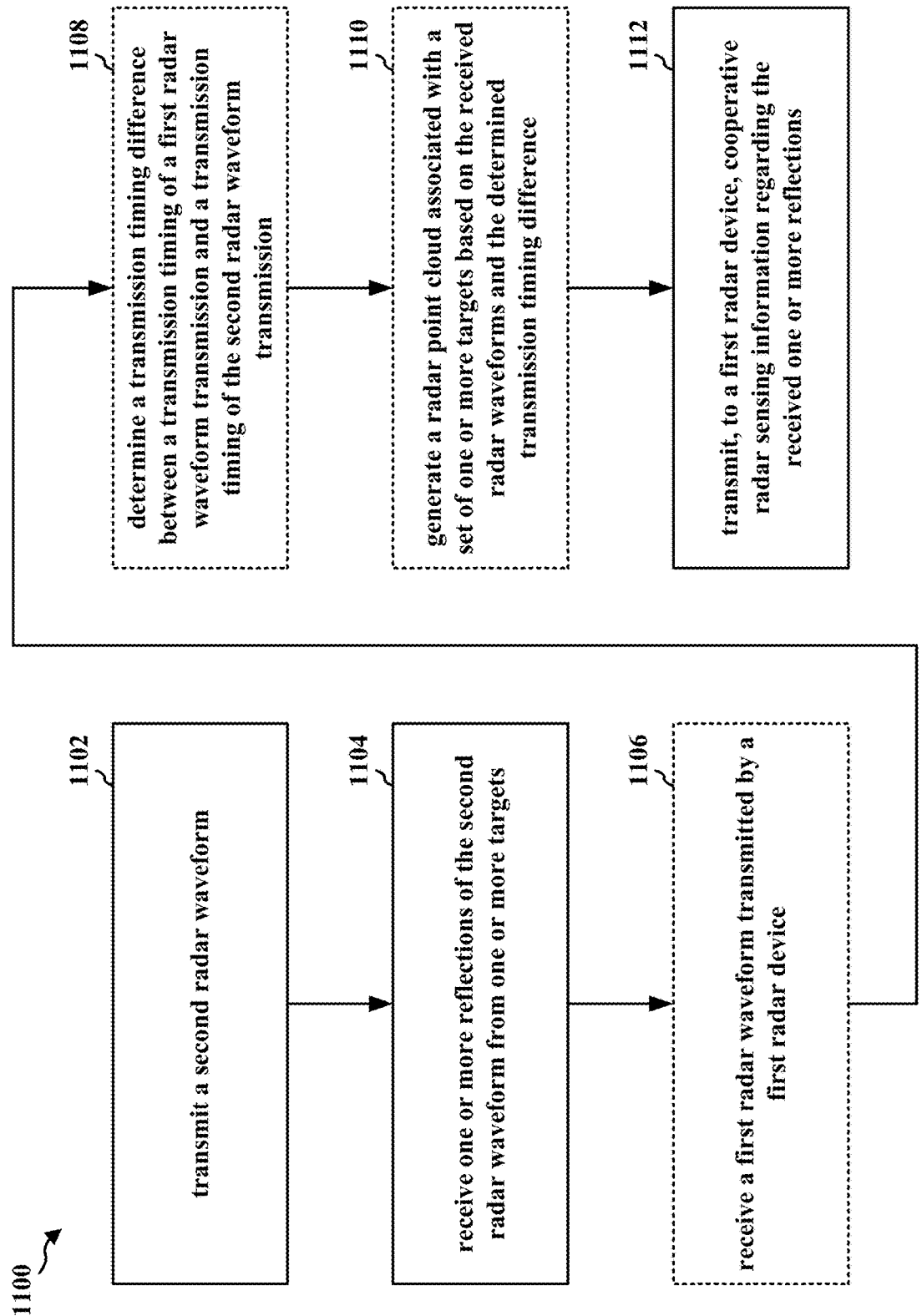
FIG. 11 is a flowchart of a method of cooperative radar sensing.

FIG. 11 is a flowchart 1100 of a method of cooperative radar sensing. The method may be performed by a second radar device (e.g., RD 504) associated with a UE (e.g., the vehicle 104; the vehicle 404/604/704/804/904; the apparatus 1302). At 1102, the second radar device may transmit a second radar waveform. The second radar waveform may have a particular 'signature' (e.g., a feature of the radar waveform transmission that may be used to distinguish one radar waveform from another such as an encoded radar identifier). For example, referring to FIGS. 4 and 5, a second radar device (e.g., RD 504) associated with a second vehicle (e.g., vehicle 404) may transmit a second radar waveform (e.g., radar waveform 430 or 512). For example, 1102 may be performed by radar waveform transmission component 1340.

At 1104, the second radar device may receive one or more reflections of the second radar waveform from one or more targets. The one or more reflections of the second radar waveform may be received at different times indicating the distance to a target of the one or more targets. The received reflections may also be associated with a particular reception direction (e.g., angle) that indicates the direction of the target. The timing of the received reflections and the directions associated with the received reflections may identify a radar point for inclusion in a radar point cloud generated at 1110 discussed below. For example, referring to FIGS. 4-6, a second radar device (e.g., RD 504) associated with a vehicle (e.g., vehicle 404/604) may receive reflections (e.g., 514B) of a second radar waveform transmission (e.g., 420/512) from a set of points (e.g., 422) associated with one or more targets (e.g., vehicles 406 and 606). The second radar waveform reflections may be identified by a signature (e.g., an encoded identifier) of the second radar waveform. For example, 1104 may be performed by radar waveform reception component 1342.

At 1106, the second radar device may receive a first radar waveform transmitted by a first radar device. The second radar device, in some aspects, may participate in cooperative radar sensing with the first radar device. In some aspects, the first radar waveform is at least one of a first radar waveform received directly from the first radar device and a first radar waveform reflected from the one or more targets. The first radar waveform may have a particular 'signature' that is different from the signature of the second radar waveform. The transmission timing (or a transmission timing difference) of the first radar waveform may not be known at the second radar device with sufficient accuracy (e.g., within 0.5 ns) to enable the second radar device to determine a distance traveled by the first radar waveform before being received at the second radar device with a desired accuracy. For example, radar transmissions of different radar devices may be synchronized within 0.5 µs which gives a range of distance values of approximately 150 meters which is greater than a desired accuracy of approximately 15 cm. For example, referring to FIGS. 4-6, a second radar device (e.g., RD 504) associated with a second vehicle (e.g., vehicle 404) may receive first waveform transmissions (e.g., 508) from a first radar device (e.g., 502) associated with a first vehicle (e.g., vehicle 402 or 602). The received first radar waveform may include direct transmissions (e.g., 440 or 508) and/or reflections of the first radar waveform (e.g., 510B) from a set of points (e.g., 450 or 630) associated with one or more targets (e.g., 406, 506, 606). For example, 1106 may be performed by radar waveform reception component 1342.

At 1108, the second radar device may determine a transmission timing difference between a transmission timing of a second radar waveform (e.g., at 1102) and a transmission timing of the first radar waveform (e.g., the first radar waveform received at 1106). The second radar device may determine, at 1108, the transmission timing difference based on the second radar waveform transmission that the second radar device may receive at 1104. The second radar device may further determine, at 1108, the transmission timing difference based on the first radar waveform transmissions that the second radar device may receive at 1106. The second radar device may also determine, at 1110, the transmission timing difference based on the additional information that the second radar device may receive at 1108. The determined transmission timing difference may be used to identify a path length to the second radar device's transmitter to generate, at 1110, a radar point cloud. For example, 1108 may be performed by transmission timing difference determination component 1344.

At 1110, the second radar device may generate a radar point cloud associated with one or more targets based on the received second radar waveform, the received first radar waveform, and/or the determined transmission timing difference. In some aspects, a second radar device may also receive additional information as described above. For example, referring to FIGS. 4-9, a second radar device (e.g., RD 504) associated with a second vehicle (e.g., vehicle 404, 604, 704, 804, or 904) may generate (e.g., at 524B) a radar point cloud (e.g., radar point cloud 480). The generated radar point cloud (e.g., radar point cloud 480) may be generated based on (1) reflections (e.g., 514B) of a second radar waveform from one or more targets (e.g., from points 422 associated with vehicles 406), (2) reflections (e.g., 510B) of a first radar waveform from one or more targets (e.g., from points 450, 630, 840, and 940 associated with vehicles 406, 606, 806, and 906/910, respectively), (3) a first radar waveform (e.g., 508) received directly from a first radar device (e.g., RD 502, 712, or 812), and (4) additional information (e.g., the set of radar points 470; additional information 516A/516B, 607C, 707C, 907A/907B/907C). For example, 1110 may be performed by radar point cloud generation component 1346.

The second radar waveforms, first radar waveforms, and additional information may be aggregated by the second radar device to generate, at 1110, the radar point cloud that is most consistent with the different received data. For example, referring to FIGS. 4-9, a second radar device (e.g., RD 504) associated with a first vehicle (e.g., 404, 604, 704, 804, or 904) may generate a radar point cloud (e.g., 480) based on a determined transmission timing difference, or based on a set of candidate radar points, that is consistent with additional information received regarding one or more targets (e.g., additional information 516A/516B, 607C, 707C, or 907A/907B/907C).

At 1112, the second radar device may transmit, to a first radar device, cooperative radar sensing information regarding the received one or more reflections. The cooperative radar sensing data may be transmitted via a sidelink or a base station (e.g., relayed from, or retransmitted by a base station). The cooperative radar sensing transmitted by the second radar device may include the additional information described above and may also include information for performing cooperative radar sensing such as information regarding one or more of (1) a RD bounding box associated with the second radar device, (2) a location of a radar transmitter of the second radar device, (3) a transmission timing difference determined by the second radar device, and (4) one or more candidate radar point clouds generated by the second radar device. For example, referring to FIGS. 5 and 8, the second radar device (e.g., RD 504) associated with a second vehicle (e.g., 804) may transmit additional information (e.g., additional information 516B/816) and/or cooperative-radar-sensing data 818 to a first radar device (e.g., RD 502) associated with a first vehicle (e.g., vehicle 802). For example, 1112 may be performed by cooperative-radar-sensing information transmission component 1348.

Figure 12:
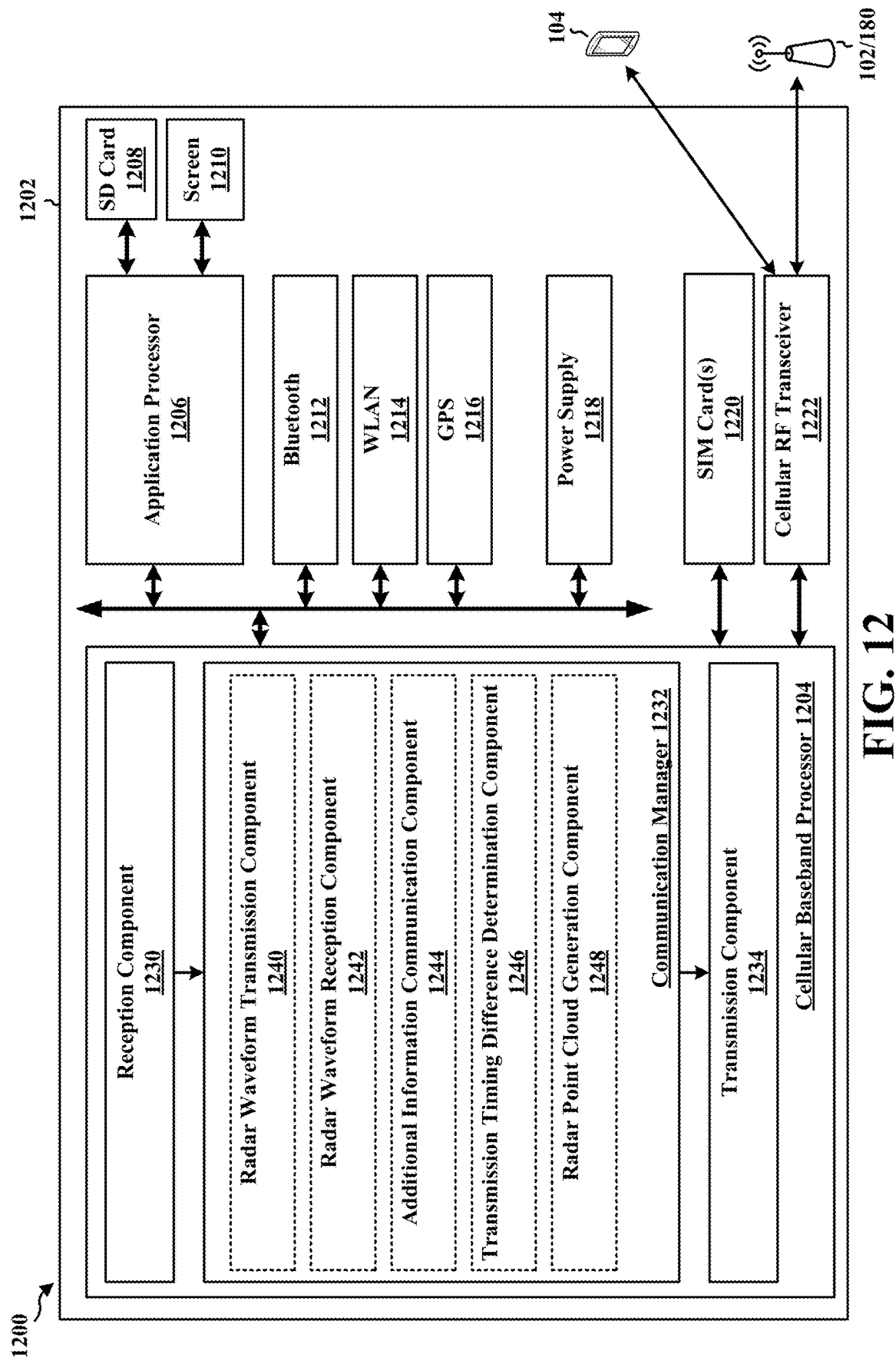
FIG. 12 is a diagram illustrating an example of a hardware implementation for an example apparatus.

FIG. 12 is a diagram 1200 illustrating an example of a hardware implementation for an apparatus 1202. The apparatus 1202 is a UE and includes a cellular baseband processor 1204 (also referred to as a modem) coupled to a cellular RF transceiver 1222 and one or more subscriber identity modules (SIM) cards 1220, an application processor 1206 coupled to a secure digital (SD) card 1208 and a screen 1210, a Bluetooth module 1212, a wireless local area network (WLAN) module 1214, a Global Positioning System (GPS) module 1216, and a power supply 1218. The cellular baseband processor 1204 communicates through the cellular RF transceiver 1222 with the UE 104 and/or BS 102/180. The cellular baseband processor 1204 may include a computer-readable medium/memory. The computer-readable medium/memory may be non-transitory. The cellular baseband processor 1204 is responsible for general processing, including the execution of software stored on the computer-readable medium/memory. The software, when executed by the cellular baseband processor 1204, causes the cellular baseband processor 1204 to perform the various functions described supra. The computer-readable medium/memory may also be used for storing data that is manipulated by the cellular baseband processor 1204 when executing software. The cellular baseband processor 1204 further includes a reception component 1230, a communication manager 1232, and a transmission component 1234. The communication manager 1232 includes the one or more illustrated components. The components within the communication manager 1232 may be stored in the computer-readable medium/memory and/or configured as hardware within the cellular baseband processor 1204. The cellular baseband processor 1204 may be a component of the UE 350 and may include the memory 360 and/or at least one of the TX processor 368, the RX processor 356, and the controller/processor 359. In one configuration, the apparatus 1202 may be a modem chip and include just the baseband processor 1204, and in another configuration, the apparatus 1202 may be the entire UE (e.g., see 350 of FIG. 3) and include the aforediscussed additional modules of the apparatus 1202.

The communication manager 1232 includes a radar waveform transmission component 1240 that is configured to transmit a first radar waveform, e.g., as described in connection with 1002 of FIG. 10. The communication manager 1232 may further include a radar waveform reception component 1242 that may be configured to receive a first radar waveform and a second radar waveform, e.g., as described in connection with 1004 and 1006 of FIG. 10. The communication manager 1232 may further include an additional information communication component 1244 that may be configured to receive and transmit additional information regarding one or more targets, e.g., as described in connection with 1008 of FIG. 10. The communication manager 1232 further includes a transmission timing difference determination component 1246 that receives input in the form of information regarding received radar waveforms from the radar waveform reception component 1242 and additional information from additional information communication component 1244 and may be configured to determine a transmission timing difference between a transmission time of a first radar waveform and a transmission time of the second radar waveform, the first radar waveform being transmitted by the first radar device, e.g., as described in connection with 1010 of FIG. 10. The communication manager 1232 further includes a radar point cloud generation component 1248 that receives input in the form of information regarding received radar waveforms from the radar waveform reception component 1242, additional information from additional information communication component 1244, and a determined transmission timing difference from transmission timing difference determination component 1246 and may be configured to generate a radar point cloud associated with one or more targets based on the received first radar waveform, the received second radar waveform, the received additional information, and the determined transmission timing difference, e.g., as described in connection with 1012 of FIG. 10.

The apparatus may include additional components that perform each of the blocks of the algorithm in the aforementioned flowcharts of FIG. 10. As such, each block in the aforementioned flowcharts of FIG. 10 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1202, and in particular the cellular baseband processor 1204, includes means for receiving a second radar waveform from a second radar device. In some configurations, the apparatus 1202, and in particular the cellular baseband processor 1204, includes means for transmitting the first radar waveform. In some configurations, the apparatus 1202, and in particular the cellular baseband processor 1204, includes means for receiving one or more reflections of the first radar waveform from one or more targets. In some configurations, the apparatus 1202, and in particular the cellular baseband processor 1204, includes means for receiving additional information regarding at least one target of the one or more targets. In some configurations, the apparatus 1202, and in particular the cellular baseband processor 1204, includes means for determining a transmission timing difference between a transmission time of a first radar waveform and a transmission time of the second radar waveform, the first radar waveform being transmitted by the first radar device. In some configurations, the apparatus 1202, and in particular the cellular baseband processor 1204, includes means for generating a radar point cloud associated with one or more targets based on the received second radar waveform and the determined transmission timing difference. The aforementioned means may be one or more of the aforementioned components of the apparatus 1202 configured to perform the functions recited by the aforementioned means. As described supra, the apparatus 1202 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 13:
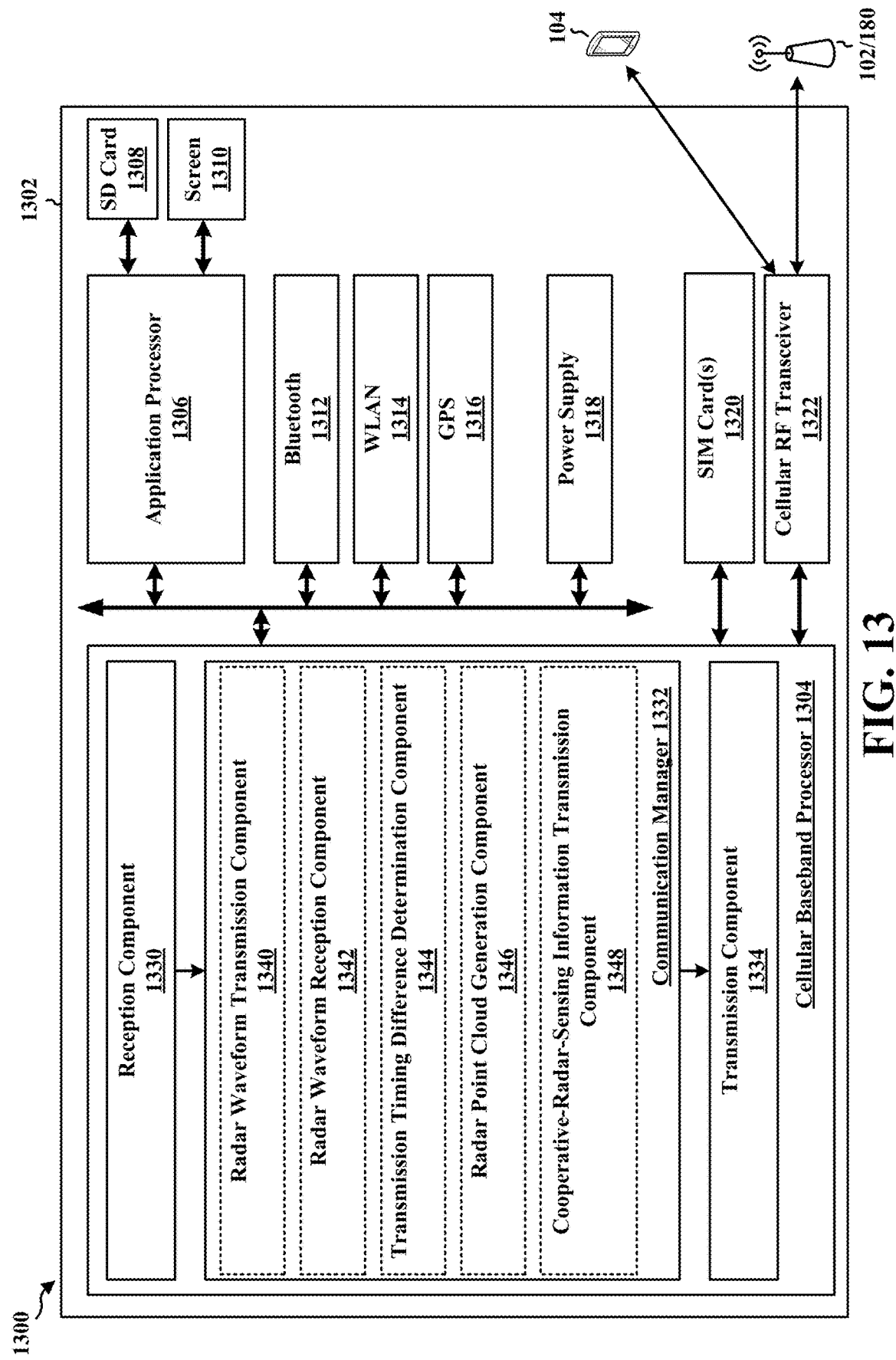
FIG. 13 is a diagram illustrating an example of a hardware implementation for an example apparatus.

FIG. 13 is a diagram 1300 illustrating an example of a hardware implementation for an apparatus 1302. The apparatus 1302 is a UE and includes a cellular baseband processor 1304 (also referred to as a modem) coupled to a cellular RF transceiver 1322 and one or more subscriber identity modules (SIM) cards 1320, an application processor 1306 coupled to a secure digital (SD) card 1308 and a screen 1310, a Bluetooth module 1312, a wireless local area network (WLAN) module 1314, a Global Positioning System (GPS) module 1316, and a power supply 1318. The cellular baseband processor 1304 communicates through the cellular RF transceiver 1322 with the UE 104 and/or BS 102/180. The cellular baseband processor 1304 may include a computer-readable medium/memory. The computer-readable medium/memory may be non-transitory. The cellular baseband processor 1304 is responsible for general processing, including the execution of software stored on the computer-readable medium/memory. The software, when executed by the cellular baseband processor 1304, causes the cellular baseband processor 1304 to perform the various functions described supra. The computer-readable medium/memory may also be used for storing data that is manipulated by the cellular baseband processor 1304 when executing software. The cellular baseband processor 1304 further includes a reception component 1330, a communication manager 1332, and a transmission component 1334. The communication manager 1332 includes the one or more illustrated components. The components within the communication manager 1332 may be stored in the computer-readable medium/memory and/or configured as hardware within the cellular baseband processor 1304. The cellular baseband processor 1304 may be a component of the UE 350 and may include the memory 360 and/or at least one of the TX processor 368, the RX processor 356, and the controller/processor 359. In one configuration, the apparatus 1302 may be a modem chip and include just the baseband processor 1304, and in another configuration, the apparatus 1302 may be the entire UE (e.g., see 350 of FIG. 3) and include the aforediscussed additional modules of the apparatus 1302.

The communication manager 1332 includes a radar waveform transmission component 1340 that may be configured to transmit a second radar waveform, e.g., as described in connection with 1102 of FIG. 11. The communication manager 1332 may further includes a radar waveform reception component 1342 that may be configured to receive, from one or more targets, one or more reflections of the second radar waveform and a first radar waveform from the first radar device, e.g., as described in connection with 1104 and 1106 of FIG. 11. The communication manager 1332 may further include a transmission timing difference determination component 1344 that receives input in the form of the received second radar waveform and a received first radar waveform from the radar waveform reception component 1342, additional information received from other vehicles or radar devices and is configured to determine a transmission timing difference between a transmission time of a first radar waveform from the first radar device and a transmission time of the second radar waveform, e.g., as described in connection with 1108 of FIG. 11. The communication manager 1332 may further include a radar point cloud generation component 1346 that receives input in the form of information regarding received radar waveforms from the radar waveform reception component 1342, additional information from other devices, and a determined transmission timing difference from transmission timing difference determination component 1344 and may be configured to generate a radar point cloud associated with one or more targets based on the received first radar waveform, the received second radar waveform, any received additional information, and the determined transmission timing difference, e.g., as described in connection with 1110 of FIG. 11. The communication manager 1332 may further include a cooperative-radar-sensing information transmission component 1348 that receives input in the form of a determined transmission timing difference from the transmission timing difference determination component 1344 and/or a radar point cloud generation from the component 1346 and is configured to transmit, to a first radar device, cooperative radar sensing information regarding the received one or more reflections, e.g., as described in connection with 1112 of FIG. 11.

The apparatus may include additional components that perform each of the blocks of the algorithm in the aforementioned flowcharts of FIG. 11. As such, each block in the aforementioned flowcharts of FIG. 11 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1302, and in particular the cellular baseband processor 1304, includes means for transmitting a second radar waveform. In some configurations, the apparatus 1302, and in particular the cellular baseband processor 1304, includes means for receiving, from one or more targets, one or more reflections of the second radar waveform. In some configurations, the apparatus 1302, and in particular the cellular baseband processor 1304, includes means for receiving a first radar waveform from the first radar device. In some configurations, the apparatus 1302, and in particular the cellular baseband processor 1304, includes means for determining a transmission timing difference between a transmission time of a first radar waveform from the first radar device and a transmission time of the second radar waveform. In some configurations, the apparatus 1302, and in particular the cellular baseband processor 1304, includes means for generating a one or more candidate radar point clouds associated with the one or more targets based on the first radar waveform and the determined transmission timing difference. In some configurations, the apparatus 1302, and in particular the cellular baseband processor 1304, includes means for transmitting, to a first radar device, cooperative radar sensing information regarding the received one or more reflections.

For mmW radars, vehicles may present "smooth" surfaces (e.g., surfaces with irregularities that are smaller than the wavelength of the radar waves). Incident mmW radar waves may experience specular reflections from such "smooth" surfaces and may not be reflected back to a mmW radar source (e.g., may not generate points in a radar point cloud). A failure to receive the reflected radar waves due to specular reflection may lead to a sparse point cloud. Accordingly, for mmW radars there may be a benefit to using cooperative (e.g., bi-static or multi-static) radar sensing to provide additional points in a radar point cloud based on mmW radar transmissions from another radar source(s).

Cooperative radar sensing with multiple radar devices may provide additional data. However, in order to achieve a desired radar resolution (e.g., 15 cm) based on cooperative radar sensing, timing synchronization should be better than a timing synchronization used for communication. For example, for a 15 cm radar resolution, a timing synchronization should be within approximately 0.5 ns compared to a timing synchronization of within approximately 3 m used for communication. Such timing accuracy is difficult to achieve. Thus, it may be beneficial to achieve similar radar resolution without relying on achieving a timing accuracy of approximately 0.5 ns. Receiving cooperative-radar-sensing data from one or more other radar devices at a first radar device may allow the first radar device to generate a denser radar point cloud with more accuracy than might be possible without the cooperative radar sensing data. Receiving additional information may also allow the first radar device to generate a denser radar point cloud with more accuracy than might be possible without the additional information.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is a method of wireless communication of a first radar device, including receiving a second radar waveform from a second radar device; determining a transmission timing difference between a transmission time of a first radar waveform and a transmission time of the second radar waveform, the first radar waveform being transmitted by the first radar device; and generating a radar point cloud associated with one or more targets based on the received second radar waveform and the determined transmission timing difference.

Aspect 2 is the method of aspect 1, further including transmitting the first radar waveform; and receiving one or more reflections of the first radar waveform from one or more targets, where generating the radar point cloud is further based on the received one or more reflections of the first radar waveform.

Aspect 3 is the method of any of aspects 1 and 2, where the received second radar waveform is received directly from the second radar device or reflected off the one or more targets after being transmitted by the second radar device.

Aspect 4 is the method of any of aspects 1 to 3, further including receiving additional information regarding at least one target of the one or more targets, where at least one of determining the transmission timing difference or generating the radar point cloud is based on the received additional information.

Aspect 5 is the method of aspect 4, where at least one of determining the transmission timing difference or generating the radar point cloud is based on associating the received additional information with the received second radar waveform.

Aspect 6 is the method of any of aspects 4 or 5, where the received additional information regarding each target of the at least one target comprises at least one of information regarding (1) a bounding box associated with the target, (2) a location associated with the target, (3) a location associated with the target and an accuracy of information associated with the location, (4) an orientation associated with the target, (5) an orientation associated with the target and an accuracy of information associated with the orientation, (6) a nature of the target, (7) a heading associated with the target, (8) a heading associated with the target and an accuracy of information associated with the heading, (9) a size of the target, (10) dimensions associated with the target, (11) a velocity associated with the target, or (12) a velocity associated with the target and an accuracy of information associated with the velocity.

Aspect 7 is the method of any of aspects 4 to 6, where the additional information is received from the second radar device for performing cooperative radar sensing, the additional information comprising at least one of information regarding (1) a bounding box associated with the second radar device, (2) a location of a radar transmitter of the second radar device, (3) an additional transmission timing difference determined by the second radar device, or (4) one or more candidate radar point clouds generated by the second radar device, and where at least one of determining the transmission timing difference and generating the radar point cloud is based on the information regarding the location of the radar transmitter within the bounding box.

Aspect 8 is the method of aspect 7, where the additional information is received from the second radar device via one of a sidelink or a base station.

Aspect 9 is the method of any of aspects 4-8, where the received additional information comprises at least one of (1) information included in BSMs received from the one or more targets, (2) information included in sensor sharing messages received from the one or more targets, or (3) information from other sensors associated with the first radar device.

Aspect 10 is a method of wireless communication of a second radar device, including transmitting a second radar waveform; receiving, from one or more targets, one or more reflections of the second radar waveform; and transmitting, to a first radar device, cooperative radar sensing information regarding the received one or more reflections.

Aspect 11 is the method of aspect 10, further including receiving a first radar waveform from the first radar device, where the cooperative radar sensing information further includes information regarding the received first radar waveform.

Aspect 12 is the method of aspect 11 where the received first radar waveform is received directly from the first radar device or reflected off the one or more targets after being transmitted by the first radar device.

Aspect 13 is the method of any of aspects 10-12, further including determining a transmission timing difference between a transmission time of a first radar waveform from the first radar device and a transmission time of the second radar waveform, where the cooperative radar sensing information includes the determined transmission timing difference.

Aspect 14 is the method of aspect 13, further including generating one or more candidate radar point clouds associated with the one or more targets based on the first radar waveform and the determined transmission timing difference, where the cooperative radar sensing information includes information regarding the generated one or more candidate radar point clouds.

Aspect 15 is the method of any of aspects 10 to 14, where the cooperative radar sensing information includes information regarding at least one of a bounding box associated with the second radar device or a location of a radar transmitter of the second radar device.

Aspect 16 is an apparatus for wireless communication including at least one processor coupled to a memory and configured to implement a method as in any of aspects 1 to 15.

Aspect 17 is an apparatus for wireless communication including means for implementing a method as in any of aspects 1 to 15.

Aspect 18 is a computer-readable medium storing computer executable code, where the code when executed by a processor causes the processor to implement a method as in any of aspects 1 to 15.

What is claimed is:

1. A method of wireless communication of a first radar device associated with a first vehicle, comprising:
   receiving, from a second radar device associated with a second vehicle, a second radar waveform;
   determining a transmission timing difference between a first transmission time of a first radar waveform and a second transmission time of the second radar waveform, the first radar waveform being transmitted by the first radar device associated with the first vehicle; and
   generating a radar point cloud associated with one or more targets based on the received second radar waveform and the determined transmission timing difference.

2. The method of claim 1, further comprising:
   transmitting the first radar waveform; and
   receiving one or more reflections of the first radar waveform from the one or more targets, wherein generating the radar point cloud is further based on the received one or more reflections of the first radar waveform.

3. The method of claim 1, wherein the received second radar waveform is received directly from the second radar device or reflected off the one or more targets after being transmitted by the second radar device.

4. The method of claim 1, further comprising receiving, from at least one of the second vehicle or at least one target of the one or more targets, additional information regarding the at least one target of the one or more targets, wherein at least one of determining the transmission timing difference or generating the radar point cloud is based on the received additional information.

5. The method of claim 4, wherein at least one of determining the transmission timing difference or generating the radar point cloud is based on associating the received additional information with the received second radar waveform.

6. The method of claim 4, wherein the additional information is received from the at least one target, and wherein the received additional information comprises at least one of information regarding (1) a bounding box associated with the at least one target, (2) a location associated with the at least one target, (3) the location associated with the at least one target and an accuracy of information associated with the location, (4) an orientation associated with the at least one target, (5) the orientation associated with the at least one target and an accuracy of information associated with the orientation, (6) a nature of the at least one target, (7) a heading associated with the at least one target, (8) the heading associated with the at least one target and an accuracy of information associated with the heading, (9) a size of the at least one target, (10) dimensions associated with the at least one target, (11) a velocity associated with the at least one target, or (12) the velocity associated with the at least one target and an accuracy of information associated with the velocity.

7. The method of claim 4, wherein the additional information is received from the second vehicle associated with the second radar device for performing cooperative radar sensing, the additional information comprising at least one of information regarding (1) a bounding box associated with the second radar device, (2) a location of a radar transmitter of the second radar device, (3) an additional transmission timing difference determined by the second radar device, or (4) one or more candidate radar point clouds generated by the second radar device, and wherein at least one of determining the transmission timing difference and generating the radar point cloud is based on the information regarding the location of the radar transmitter within the bounding box.

8. The method of claim 7, wherein the additional information is received from the second vehicle via one of a sidelink or a base station.

9. The method of claim 4, wherein the received additional information comprises at least one of (1) first information included in basic safety messages (BSMs) received from the at least one target of the one or more targets or (2) second information included in sensor sharing messages received from the at least one target of the one or more targets.

10. A method of wireless communication of a second radar device associated with a second vehicle, comprising:
    transmitting a second radar waveform;
    receiving, from one or more targets, one or more reflections of the second radar waveform; and
    transmitting, to a first radar device associated with a first vehicle, cooperative radar sensing information regarding the received one or more reflections.

11. The method of claim 10, further comprising receiving a first radar waveform from the first radar device, wherein the cooperative radar sensing information further includes information regarding the received first radar waveform.

12. The method of claim 11, wherein the received first radar waveform is received directly from the first radar device or reflected off the one or more targets after being transmitted by the first radar device.

13. The method of claim 10, further comprising determining a transmission timing difference between a first transmission time of a first radar waveform from the first radar device and a second transmission time of the second radar waveform, wherein the cooperative radar sensing information includes the determined transmission timing difference.

14. The method of claim 13, further comprising generating one or more candidate radar point clouds associated with the one or more targets based on the first radar waveform and the determined transmission timing difference, wherein the cooperative radar sensing information includes information regarding the generated one or more candidate radar point clouds.

15. The method of claim 10, wherein the cooperative radar sensing information includes information regarding at least one of a bounding box associated with the second radar device or a location of a radar transmitter of the second radar device.

16. An apparatus for wireless communication associated with a first vehicle, comprising:
    a memory; and
    at least one processor coupled to the memory and configured to:
       receive, from a second radar device associated with a second vehicle, a second radar waveform;
       determine a transmission timing difference between a first transmission time of a first radar waveform and a second transmission time of the second radar waveform, the first radar waveform being transmitted by a first radar device associated with the first vehicle; and
       generate a radar point cloud associated with one or more targets based on the received second radar waveform and the determined transmission timing difference.

17. The apparatus of claim 16, wherein the at least one processor is further configured to:
transmit the first radar waveform; and
receive one or more reflections of the first radar waveform from the one or more targets, wherein to generate the radar point cloud, the at least one processor is configured to generate the radar point cloud further based on the received one or more reflections of the first radar waveform.

18. The apparatus of claim 16, wherein to receive the second radar waveform, the at least one processor is configured to receive the second radar waveform directly from the second radar device or reflected off the one or more targets after being transmitted by the second radar device.

19. The apparatus of claim 16, wherein the at least one processor is further configured to receive, from at least one of the second vehicle or at least one target of the one or more targets, additional information regarding the at least one target of the one or more targets, wherein at least one of the determination of the transmission timing difference or the generation of the radar point cloud is based on the received additional information.

20. The apparatus of claim 19, wherein at least one of the determination of the transmission timing difference or the generation of the radar point cloud is based on an association of the received additional information with the received second radar waveform.

21. The apparatus of claim 19, wherein the additional information received from the at least one target comprises at least one of information regarding (1) a bounding box associated with the at least one target, (2) a location associated with the at least one target, (3) the location associated with the at least one target and an accuracy of information associated with the location, (4) an orientation associated with the at least one target, (5) the orientation associated with the at least one target and an accuracy of information associated with the orientation, (6) a nature of the at least one target, (7) a heading associated with the at least one target, (8) the heading associated with the at least one target and an accuracy of information associated with the heading, (9) a size of the at least one target, (10) dimensions associated with the at least one target, (11) a velocity associated with the at least one target, or (12) the velocity associated with the at least one target and an accuracy of information associated with the velocity.

22. The apparatus of claim 19, wherein the additional information received from the second vehicle associated with the second radar device is associated with cooperative radar sensing and the additional information comprises at least one of information regarding (1) a bounding box associated with the second radar device, (2) a location of a radar transmitter of the second radar device, (3) an additional transmission timing difference determined by the second radar device, or (4) one or more candidate radar point clouds generated by the second radar device, and wherein at least one of determining the transmission timing difference and generating the radar point cloud is based on the information regarding the location of the radar transmitter within the bounding box.

23. The apparatus of claim 22, wherein to receive the additional information, the at least one processor is configured to receive the additional information from the second vehicle via one of a sidelink or a base station.

24. The apparatus of claim 19, wherein the received additional information comprises at least one of (1) first information included in basic safety messages (BSMs) received from the at least one target of the one or more targets or (2) second information included in sensor sharing messages received from the at least one target of the one or more targets.

25. An apparatus for wireless communication associated with a second vehicle, comprising:
a memory; and
at least one processor coupled to the memory and configured to:
transmit a second radar waveform;
receive, from one or more targets, one or more reflections of the second radar waveform; and
transmit, to a first radar device associated with a first vehicle, cooperative radar sensing information regarding the received one or more reflections.

26. The apparatus of claim 25, wherein the at least one processor is further configured to receive a first radar waveform from the first radar device, wherein the cooperative radar sensing information further includes information regarding the received first radar waveform.

27. The apparatus of claim 26, wherein to receive the first radar waveform, the at least one processor is configured to receive the first radar waveform directly from the first radar device or reflected off the one or more targets after being transmitted by the first radar device.

28. The apparatus of claim 25, wherein the at least one processor is further configured to determine a transmission timing difference between a first transmission time of a first radar waveform from the first radar device and a second transmission time of the second radar waveform, wherein the cooperative radar sensing information includes the determined transmission timing difference.

29. The apparatus of claim 28, wherein the at least one processor is further configured to generate one or more candidate radar point clouds associated with the one or more targets based on the first radar waveform and the determined transmission timing difference, wherein the cooperative radar sensing information includes information regarding the generated one or more candidate radar point clouds.

30. The apparatus of claim 25, wherein the cooperative radar sensing information includes information regarding at least one of a bounding box associated with the second radar device or a location of a radar transmitter of the second radar device.

* * * * *